US012087130B2

(12) United States Patent
Soukup et al.

(10) Patent No.: US 12,087,130 B2
(45) **Date of Patent: *Sep. 10, 2024**

(54) CASINO MANAGEMENT SYSTEM WITH A PATRON FACIAL RECOGNITION SYSTEM AND METHODS OF OPERATING SAME

(71) Applicant: Konami Gaming, Inc., Las Vegas, NV (US)

(72) Inventors: Thomas E. Soukup, Las Vegas, NV (US); Edward Sepich, Henderson, NV (US); Jeffrey George, Las Vegas, NV (US); Jason Bertsch, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,754

(22) Filed: Aug. 30, 2022

(65) Prior Publication Data

US 2023/0113391 A1 Apr. 13, 2023

Related U.S. Application Data

(63) Continuation of application No. 17/100,300, filed on Nov. 20, 2020, now Pat. No. 11,455,864, which is a continuation of application No. 16/519,378, filed on Jul. 23, 2019, now Pat. No. 10,878,657.

(60) Provisional application No. 62/703,272, filed on Jul. 25, 2018.

(51) Int. Cl.
*G07F 17/32* (2006.01)

(52) U.S. Cl.
CPC ...... *G07F 17/3241* (2013.01); *G07F 17/3223* (2013.01); *G07F 17/3239* (2013.01)

(58) Field of Classification Search
CPC ........................................ G07F 17/32
See application file for complete search history.

(56) References Cited

U.S. PATENT DOCUMENTS

| | | | |
|---|---|---|---|
| 6,141,319 | A | 10/2000 | Dighe et al. |
| 6,142,876 | A | 11/2000 | Cumbers |
| 6,234,900 | B1 | 5/2001 | Cumbers |
| 6,554,705 | B1 | 4/2003 | Cumbers |

(Continued)

FOREIGN PATENT DOCUMENTS

| | | | |
|---|---|---|---|
| JP | 3307354 | B2 | 7/2002 |
| JP | 3528915 | B2 | 5/2004 |

(Continued)

*Primary Examiner* — Omkar A Deodhar

(74) *Attorney, Agent, or Firm* — Howard & Howard Attorneys PLLC

(57) ABSTRACT

A networked casino management computer system is described herein. The networked casino management computer system includes a facial recognition system and a casino management server. The facial recognition system is programmed receive a facial image from an imaging device, access a biometric database and select a face ID matching the received facial image, and transmit the selected face ID and location information associated with the imaging device to the casino management system. The casino management system is programmed to access a player database and identify a player record associated with the selected face ID, identify a device located within the casino that is associated with the imaging device, and record activity of the identified device to the identified player record.

27 Claims, 32 Drawing Sheets

(56) References Cited

U.S. PATENT DOCUMENTS

| | | | |
|---|---|---|---|
| 6,580,821 | B1 | 6/2003 | Roy |
| 6,783,459 | B2 | 8/2004 | Cumbers |
| 6,853,745 | B1 | 2/2005 | Jacobs et al. |
| 6,928,231 | B2 | 4/2005 | Tajima |
| 6,888,960 | B2 | 5/2005 | Penev et al. |
| 6,956,569 | B1 | 10/2005 | Roy et al. |
| 7,006,684 | B2 | 2/2006 | Thornber et al. |
| 7,058,217 | B2 | 6/2006 | Thornber et al. |
| 7,175,528 | B1 | 2/2007 | Cumbers |
| 7,218,773 | B2 | 5/2007 | Ishiyama |
| 7,227,973 | B2 | 6/2007 | Ishiyama |
| 7,236,615 | B2 | 6/2007 | Miller et al. |
| 7,248,721 | B2 | 6/2007 | Sato et al. |
| 7,288,025 | B1 | 10/2007 | Cumbers |
| 7,298,270 | B2 | 11/2007 | Ishiguro et al. |
| 7,308,120 | B2 | 12/2007 | Sato et al. |
| 7,313,266 | B2 | 12/2007 | Ishiyama |
| 7,321,370 | B2 | 1/2008 | Ishiyama |
| 7,357,717 | B1 | 4/2008 | Cumbers |
| 7,526,123 | B2 | 4/2009 | Moon et al. |
| 7,545,973 | B2 | 6/2009 | Hamanaka |
| 7,593,019 | B2 | 9/2009 | Ishiyama |
| 7,593,551 | B2 | 9/2009 | Kamei |
| 7,680,299 | B2 | 3/2010 | Hosoi |
| 7,706,601 | B2 | 4/2010 | Hamanaka |
| 7,710,431 | B2 | 5/2010 | Ishiyama |
| 7,715,619 | B2 | 5/2010 | Hamanaka |
| 7,720,689 | B2 | 5/2010 | Hoshino |
| 7,783,581 | B2 | 8/2010 | Hosoi et al. |
| 7,809,159 | B2 | 10/2010 | Ishiyama |
| 7,860,340 | B2 | 12/2010 | Marugame et al. |
| 7,873,208 | B2 | 1/2011 | Hamanaka |
| 7,932,913 | B2 | 4/2011 | Ishiyama |
| 7,986,813 | B2 | 7/2011 | Hamanaka |
| 8,035,640 | B2 | 10/2011 | Aoyama et al. |
| 8,121,357 | B2 | 2/2012 | Imaoka |
| 8,167,710 | B2 | 5/2012 | Agarwal et al. |
| 8,282,478 | B2 | 10/2012 | Lyons |
| 8,295,614 | B2 | 10/2012 | Ishiyama |
| 8,315,441 | B2 | 11/2012 | Hamada |
| 8,320,660 | B2 | 11/2012 | Ishiyama |
| 8,374,458 | B2 | 2/2013 | Inoue |
| 8,457,389 | B2 | 6/2013 | Ishiyama |
| 8,553,983 | B2 | 10/2013 | Imaoka |
| 8,558,952 | B2 | 11/2013 | Ishikawa |
| 8,660,321 | B2 | 2/2014 | Hosoi |
| 8,699,788 | B2 | 4/2014 | Ishiyama |
| 8,737,697 | B2 | 5/2014 | Morishita |
| 8,749,658 | B2 | 6/2014 | Hamada |
| 8,860,795 | B2 | 10/2014 | Suzuki |
| 8,897,568 | B2 | 11/2014 | Miyano |
| 8,938,132 | B2 | 1/2015 | Hamada |
| 8,958,609 | B2 | 2/2015 | Yasukawa et al. |
| 8,971,613 | B2 | 3/2015 | Miyano |
| 9,036,903 | B2 | 5/2015 | Hosoi |
| 9,111,176 | B2 | 8/2015 | Hamada |
| 9,117,331 | B2 | 8/2015 | Englman et al. |
| 9,230,314 | B2 | 1/2016 | Kitano |
| 9,313,450 | B2 | 4/2016 | Ichimura et al. |
| 9,342,770 | B2 | 5/2016 | Oami et al. |
| 9,679,221 | B2 | 6/2017 | Mase |
| 9,779,207 | B2 | 10/2017 | Ishii |
| 9,779,286 | B2 | 10/2017 | Morishita |
| 9,811,540 | B2 | 11/2017 | Feng et al. |
| 9,836,655 | B2 | 12/2017 | Hao |
| 9,858,501 | B2 | 1/2018 | Morishita |
| 9,875,393 | B2 | 1/2018 | Lin et al. |
| 9,881,203 | B2 | 1/2018 | Hayasaka |
| 9,904,843 | B2 | 2/2018 | Morishita |
| 9,916,495 | B2 | 3/2018 | Hayasaka |
| 10,025,603 | B2 | 7/2018 | Sakai |
| 10,068,073 | B2 | 9/2018 | Ishii |
| 10,140,354 | B2 | 11/2018 | Araki |
| 2006/0177109 | A1 | 8/2006 | Storch |
| 2008/0188308 | A1 | 8/2008 | Sheperd et al. |
| 2009/0124376 | A1 | 5/2009 | Kelly et al. |
| 2009/0176566 | A1 | 7/2009 | Kelly |
| 2009/0291755 | A1 | 11/2009 | Walker et al. |
| 2016/0224837 | A1 | 8/2016 | Lipert et al. |

FOREIGN PATENT DOCUMENTS

| | | | |
|---|---|---|---|
| JP | 2005-312510 | A | 11/2005 |
| JP | 3818369 | B2 | 9/2006 |
| JP | 3823760 | B2 | 9/2006 |
| JP | 3873793 | B2 | 1/2007 |
| JP | 3903783 | B2 | 4/2007 |
| JP | 3926059 | B2 | 6/2007 |
| JP | 3976056 | B2 | 9/2007 |
| JP | 4029413 | B2 | 1/2008 |
| JP | 4096826 | B2 | 6/2008 |
| JP | 4099981 | B2 | 6/2008 |
| JP | 4135674 | B2 | 8/2008 |
| JP | 4143305 | B2 | 9/2008 |
| JP | 4161659 | B2 | 10/2008 |
| JP | 4167390 | B2 | 10/2008 |
| JP | 2008-287658 | A | 11/2008 |
| JP | 4238542 | B2 | 3/2009 |
| JP | 4284664 | B2 | 6/2009 |
| JP | 4292837 | B2 | 7/2009 |
| JP | 4349367 | B2 | 10/2009 |
| JP | 4375570 | B2 | 12/2009 |
| JP | 4375571 | B2 | 12/2009 |
| JP | 4379459 | B2 | 12/2009 |
| JP | 4465719 | B2 | 5/2010 |
| JP | 4552431 | B2 | 9/2010 |
| JP | 4553141 | B2 | 9/2010 |
| JP | 4556873 | B2 | 10/2010 |
| JP | 4560832 | B2 | 10/2010 |
| JP | 4573085 | B2 | 11/2010 |
| JP | 4604612 | B2 | 1/2011 |
| JP | 4622106 | B2 | 2/2011 |
| JP | 4623320 | B2 | 2/2011 |
| JP | 4692773 | B2 | 6/2011 |
| JP | 4697670 | B2 | 6/2011 |
| JP | 2011-139872 | A | 7/2011 |
| JP | 4721052 | B2 | 7/2011 |
| JP | 4742068 | B2 | 8/2011 |
| JP | 4742734 | B2 | 8/2011 |
| JP | 4770869 | B2 | 9/2011 |
| JP | 4770932 | B2 | 9/2011 |
| JP | 4793698 | B2 | 10/2011 |
| JP | 4803214 | B2 | 10/2011 |
| JP | 4816874 | B2 | 11/2011 |
| JP | 4860289 | B2 | 1/2012 |
| JP | 4924836 | B2 | 4/2012 |
| JP | 4929828 | B2 | 5/2012 |
| JP | 4957921 | B2 | 6/2012 |
| JP | 4973188 | B2 | 7/2012 |
| JP | 5035467 | B2 | 9/2012 |
| JP | 5136965 | B2 | 2/2013 |
| JP | 5151451 | B2 | 2/2013 |
| JP | 2014-126912 | A | 7/2014 |
| JP | 2015-150318 | A | 8/2015 |
| JP | 6264380 | B2 | 1/2018 |
| JP | 6278276 | B2 | 2/2018 |
| JP | 6279771 | B2 | 2/2018 |
| JP | 6287827 | B2 | 3/2018 |
| JP | 6292295 | B2 | 3/2018 |
| JP | 6292341 | B2 | 3/2018 |
| JP | 6299592 | B2 | 3/2018 |
| JP | 6304230 | B2 | 4/2018 |
| JP | 6311237 | B2 | 4/2018 |
| JP | 6315144 | B2 | 4/2018 |
| JP | 6365915 | B2 | 8/2018 |
| JP | 6369543 | B2 | 8/2018 |
| JP | 6387831 | B2 | 9/2018 |
| JP | 6424822 | B2 | 11/2018 |
| JP | 6428914 | B2 | 11/2018 |
| JP | 6432634 | B2 | 12/2018 |
| JP | 6451861 | B2 | 1/2019 |
| JP | 6465027 | B2 | 2/2019 |

(56) References Cited

FOREIGN PATENT DOCUMENTS

| | | | |
|---|---|---|---|
| JP | 6485655 | B2 | 3/2019 |
| JP | 6409929 | B2 | 4/2019 |
| KR | 10-1352913 | B1 | 9/2014 |

FIG. 7
98
104
58
100
WIN
53682
$536.82
60
$0.60
REWARD
280
$2.80
1¢
Casino Portal
Welcome, Sarah! You have Free Play! You have a Tournament!
Points: 15625
Comp Points: 8950

106

108

152

110 114 150 142 130 132 153 151

| User ID | Face ID | Patron Name | Birthdate | Total Wagers | Current Tier Points | Tier Points to Next Tier | Date | Gender | Age | Type | Face Size |
|---|---|---|---|---|---|---|---|---|---|---|---|
| 10001313 | FaceID092 | John Smith | 12/16/1965 | $20,034 | 99485 | 515 | 05/05/2018 | M | 36 | player | 114,"x":370,"y":238 |
| 10001365 | FaceID098 | Jane Doe | 01/12/1974 | $15,678 | 45259 | 4742 | 06/12/2018 | F | 21 | player | 108,"x":354,"y":216 |
| 10002365 | FaceID674 | Mary Doe | 07/29/1975 | $10,129 | 47695 | 2105 | 05/22/2018 | F | 35 | player | 125,"x":405,"y":296 |

154

154

FIG. 8B

124

126

128

Patron ID: 10001315 Face ID: FaceID0098 114

Address: N/A

Postal Code: N/A

130/132 Gender/Age: M/36

136 142 144 148 146 150

| Session ID | Date | Start | End | Game Type | Total Wagered Amount |
|---|---|---|---|---|---|
| 138 Session001 | 01/25/2018 | 10:30 | 12:05 | EGM0102 | $432.00 |
| 140 Session002 | 01/31/2018 | 12:19 | 13:12 | EGM0201 | $205.00 |
| Session003 | 03/28/2018 | 20:25 | 21:22 | EGT123 | $50.00 |
| Session004 | 05/5/2018 | 17:26 | 19:45 | EGT0456 | $330.00 |
| Session005 | 05/19/2018 | 19:22 | 21:55 | POS0215 | $150.00 |

FIG. 9A

124 152 126

| Anonymous User ID (128) | Face ID (114) | Patron Name | Birthdate | Total Wagers (150) | Current Tier Points | Tier Points to Next Tier | Date (142) | Gender (130) | Age (132) | Type (153) | Face Size (151) |
|---|---|---|---|---|---|---|---|---|---|---|---|
| 10001315 | FaceID142 | N/A | N/A | $20,521 | 7854 | 456 | 05/05/2018 | M | 48 | player | 141,"x":307,"y":283 |
| 10001865 | FaceID453 | N/A | N/A | $5,522 | 4526 | 4585 | 06/12/2018 | F | 52 | watcher | 158,"x":378,"y":289 |
| 10005665 | FaceID654 | N/A | N/A | $1,659 | 476 | 2581 | 05/22/2018 | F | 25 | player | 124,"x":425,"y":276 |

156 156

FIG. 9B

9

| Image Device ID | Associated Gaming Device ID | Gaming Device IP Address |
|---|---|---|
| IPCamera001 | EGM0102 | 12.345.678 |
| IPCamera002 | EGM0254 | 90.123.123 |
| IPCamera201 | EGT0076 | 10.456.456 |
| IPCamera253 | Kiosk0054 | 56.123.123 |

FIG. 10

114 7A

| Unique Face ID | Image Data |
|---|---|
| FaceID123 | Image123.file |
| FaceID456 | Image456.file |
| FaceID789 | Image789.file |

FIG. 11A 114 7B

| Unique Face ID | Image Data | Date/Time Stamp | Expiration |
|---|---|---|---|
| FaceID123 | Image123.file | 06.25.2018-12:03 | 06.25.2018-18:03 |
| FaceID456 | Image456.file | 06.25.2018-12:27 | 06.25.2018-18:27 |
| FaceID789 | Image789.file | 06.25.2018-13:10 | 06.25.2018-20:30 |

FIG. 11B

158

162 164 166

160

| Action Record ID | Triggering Event | Action Event Data | Action Event |
| --- | --- | --- | --- |
| Action01 | No movement in the predetermined area | Waiting to detect movement in the predetermined area of the area image | Constantly check for movement in the predetermined area of the area image received |
| Action02 | Movement within the predetermined area | Determine whether the movement in the predetermined area includes biometric data | Receive an area image of the predetermined area that includes the biometric data |
| Action03 | Biometric data is present in the predetermined area | Determine whether the captured biometric data is associated with a player account | Send the captured biometric data to the database to determine association with a player account |
| Action04 | Biometric data is associated with a current player account | Begin collecting the data from the EGM for the current play of the player | Collect data from the current play and save to the player account record |
| Action05 | Biometric data is not associated with a current player account | Create an anonymous player account that is associated with the unique biometric data | Create an anonymous player account |
| Action06 | Anonymous player plays game/uses credits/purchases an item | Save the data from the anonymous players actions to the anonymous player record | Save actions to the anonymous player record |

FIG. 12

168

164 (Action Rule File, Rule Description, Notification Message File)

| Face ID (114) | Action Record ID | Event Trigger (162) | Action Rule File | Rule Description | Notification Message File | Action Event (166) |
|---|---|---|---|---|---|---|
| 170 FaceID123 | Action02 | Movement within the predetermined area | Action02. API | Determine whether the movement in the predetermined area includes biometric data | InfoMessage 02 | Receive an area image of the predetermined area that includes the biometric data |
| 170 FaceID234 | Action03 | Biometric data is present in the predetermined area | Action03. API | Determine whether the captured biometric data is associated with a player account | InfoMessage 03 | Send the captured biometric data to the database to determine association with a player account |
| FaceID009 | Action04 | Biometric data is associated with a current player account | Action04. API | Begin collecting the data from the EGM for the current play of the player | InfoMessage 04 | Collect data from the current play and save to the player account record |
| FaceID006 | Action05 | Biometric data is not associated with a current player account | Action05. API | Create an anonymous player account that is associated with the unique biometric data | InfoMessage 05 | Create an anonymous player account |
| FaceID453 | Action06 | Anonymous player plays game/uses credits/purchases an item | Action06. API | Save the data from the anonymous players actions to the anonymous player record | InfoMessage06 | Save actions to the anonymous player record |

FIG. 13

CASINO MANAGEMENT SYSTEM WITH A PATRON FACIAL RECOGNITION SYSTEM AND METHODS OF OPERATING SAME

CROSS-REFERENCE TO RELATED APPLICATIONS

This application is a continuation of U.S. patent application Ser. No. 17/100,300, filed Nov. 20, 2020, which is a continuation of U.S. patent application Ser. No. 16/519,378, filed Jul. 23, 2019 (now U.S. Pat. No. 10,878,657, issued Dec. 29, 2020), which claims the benefit of U.S. Provisional Patent Application Ser. No. 62/703,272, filed on Jul. 25, 2018, the disclosures of which are hereby incorporated by reference in their entirety for all purposes.

FIELD OF THE INVENTION

The present invention relates generally to a casino management networked computer system for identifying casino patrons using biometric data, and more particularly, to methods and systems for identifying casino users using facial recognition systems.

BACKGROUND OF THE INVENTION

The growth and competition in the casino gaming market in recent years and the increasingly sophisticated and complex technology being integrated into the gaming environment, presents both challenges and opportunities to gaming establishment operators. Over recent years, casino revenue has dramatically increased in the area of non-gaming revenue sources such as, hotel and hospitality, retail, dining, entertainment and other casino products or services. Traditionally, patron tracking systems have focused on tracking patrons of electronic gaming machines, table games and other gaming revenue areas such as, bingo and keno. In this traditional scenario, a patron is identified during gaming play by a patron tracking ID card and/or a patron identification number (PIN). The patron tracking system tracks the patron's gaming play and may award patron tracking points, bonuses, and other incentives according to established criteria to promote continued patron loyalty.

Known casino management systems include player tracking devices that are connected to gaming machines. The player tracking devices require players to insert player identification cards that include player account numbers encoded on magnetic strips. The player tracking devices only work if a player is interested in being tracked during game play on the gaming machine. Many players do not wish to be tracked, because they may not want to go through the trouble of signing up for a player tracking account, or may not want to provide certain aspects of their personal information to a casino. One downside is that the loyal player may miss out on opportunities to receive rewards, promotions, advertisements, etc. While current player tracking systems target loyal customers and reward them for continuous play, there is a desire to reward loyal customers who do not wish to provide personal information. Other gaming establishment operators do not integrate biometric data capture devices into their systems for tracking anonymous user accounts and allowing current user accounts to be updated by detecting and pairing captured biometric data with the current user accounts.

In addition, there is a need to track anonymous players for suspicious activity reporting for Anti-Money Laundering (AML) and the Bank Securities Act (BSA). Casino operators are facing AML related challenges due to increased regulatory pressure and fines. The implementation of robust AML policies and procedures that effectively identify, report and mitigate risks will in turn ensure that casinos are staying ahead of criminals and preventing illicit funds derived from criminal proceeds from entering the property. By incorporating a system to track anonymous users, the criminals may be deterred from committing fraudulent acts.

Accordingly, systems are needed to improve the player tracking of anonymous players of gaming machines.

The present invention is aimed at one or more of the problems as set forth above.

SUMMARY OF THE INVENTION

In one aspect of the present invention, a networked casino management computer system is provided. The networked casino management computer system includes a facial recognition system and a casino management server. The facial recognition system includes a plurality of imaging devices positioned within a casino property and a facial recognition server system. The facial recognition server system is programmed to execute an algorithm including receiving a video image from at least one imaging device of the plurality of imaging devices, accessing a biometric database including a plurality of biometric data records including facial image data associated with facial images and unique face IDs, and retrieving a biometric data record having image data matching the received video image. The facial recognition server system transmits a notification signal including a corresponding face ID included in the retrieved biometric data record and an imaging device location ID to the casino management server. The casino management server is programmed to execute an algorithm including receiving the notification signal from the facial recognition server, accessing a user account database including a plurality of known user account records including user information associated with corresponding casino users, unique user IDs, and user face IDs, and identifying a known user account record having a user face ID matching the corresponding face ID included in the received notification signal. The casino management server identifies a gaming device associated with the imaging device location ID, transmits a session initiation signal to the identified gaming device including instructions which cause the identified gaming device to initiate a gaming session to monitor corresponding user activity and transmit gaming session information to the casino management server, and modifies the known user account record to include a unique session ID and the gaming session information received from the identified gaming device.

In another aspect of the present invention, a method of operating a networked casino management computer system is provided. The method includes a facial recognition server processor performing the steps of receiving a video image from at least one imaging device of the plurality of imaging devices, accessing a biometric database including a plurality of biometric data records, each biometric data record including facial image data associated with a facial image and a unique face ID, retrieving a biometric data record having image data matching the received video image, and transmitting a notification signal including a corresponding face ID included in the retrieved biometric data record and a imaging device location ID. A casino management server processor performs the steps of accessing a user account database including a plurality of known user account records upon receiving the notification signal from the facial recognition server. Each known user account record including user information associated with a corresponding casino user, a unique user ID, and a user face ID. The casino management server processor identifies a known user account record having a user face ID matching the corresponding face ID included in the received notification signal, identifies a gaming device associated with the imaging device location ID, transmits a session initiation signal to the identified gaming device including instructions which cause the identified gaming device to initiate a gaming session to monitor corresponding user activity and transmit gaming session information to the casino management server, and modifies the known user account record to include a unique session ID and the gaming session information received from the identified gaming device.

In a further aspect of the present invention, a non-transitory computer-readable storage medium storing computer-executable instructions, which when executed by at least one processor, cause the at least one processor to operate as a facial recognition server system and a casino management server. The facial recognition server system is programmed to receive a video image from at least one imaging device of a plurality of imaging devices, access a biometric database including a plurality of biometric data records including facial image data associated with facial images and unique face IDs, retrieve a biometric data record having image data matching the received video image, and generate and transmit a notification signal including a corresponding face ID included in the retrieved biometric data record and a imaging device location ID. The casino management server is programmed to receive the notification signal from the facial recognition server and access a user account database including a plurality of known user account records including user information associated with a corresponding casino user, unique user IDs, and user face IDs. The casino management server identifies a known user account record having a user face ID matching the corresponding face ID included in the received notification signal, identifies a gaming device associated with the imaging device location ID, transmits a session initiation signal to the identified gaming device including instructions which cause the identified gaming device to initiate a gaming session to monitor corresponding user activity and transmit gaming session information to the casino management server, and modifies the known user account record to include a unique session ID and the gaming session information received from the identified gaming device.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 8A-13 are illustrations of exemplary database records generated by the system shown in FIG. 1, according to embodiments of the present invention;

Corresponding reference characters indicate corresponding parts throughout the drawings.

DETAILED DESCRIPTION OF INVENTION

Figure 1:
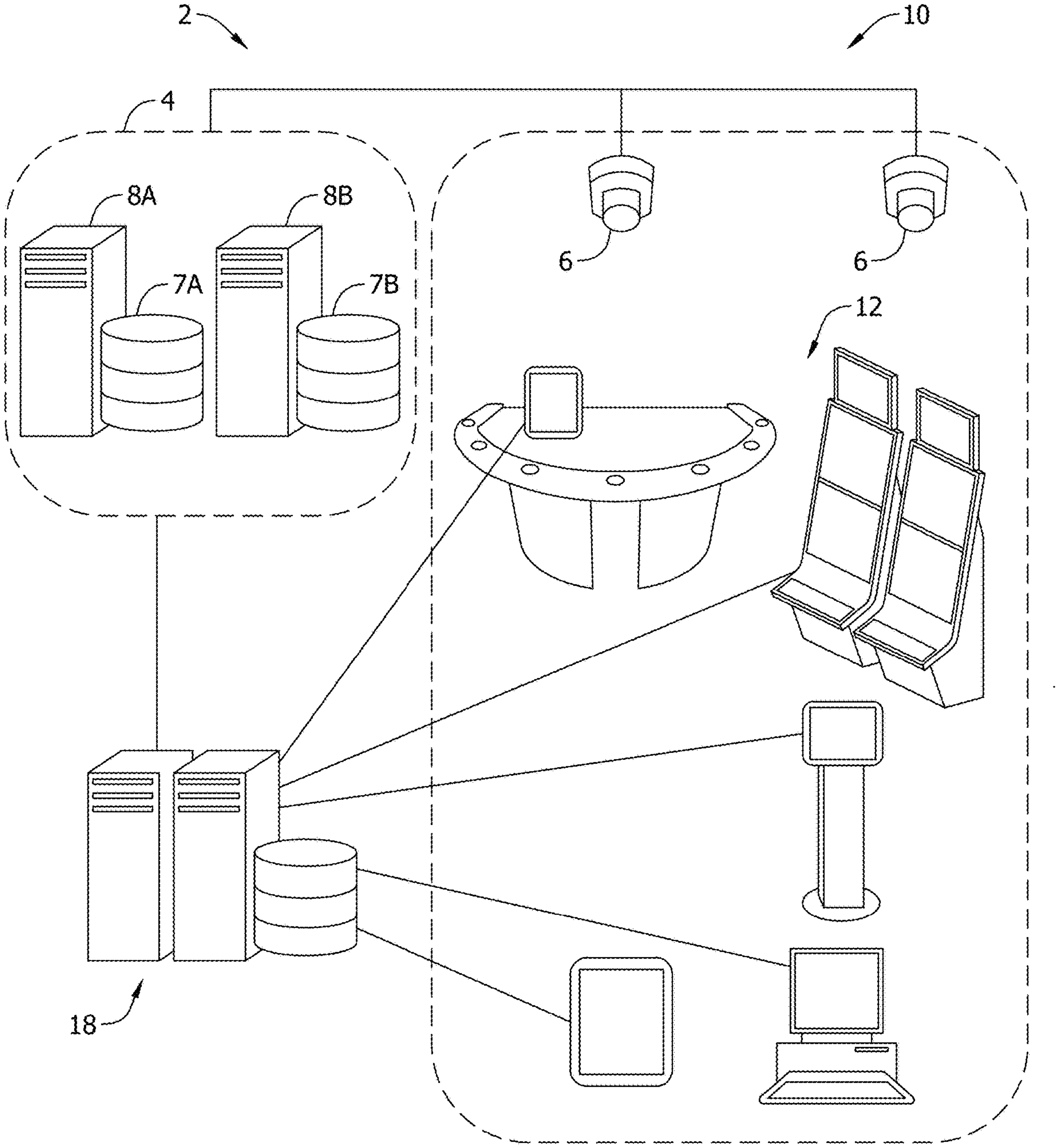
FIGS. 1-4 are schematic illustrations of a networked casino management computer system including a facial recognition system, according to an embodiment of the present invention.
Figure 2:
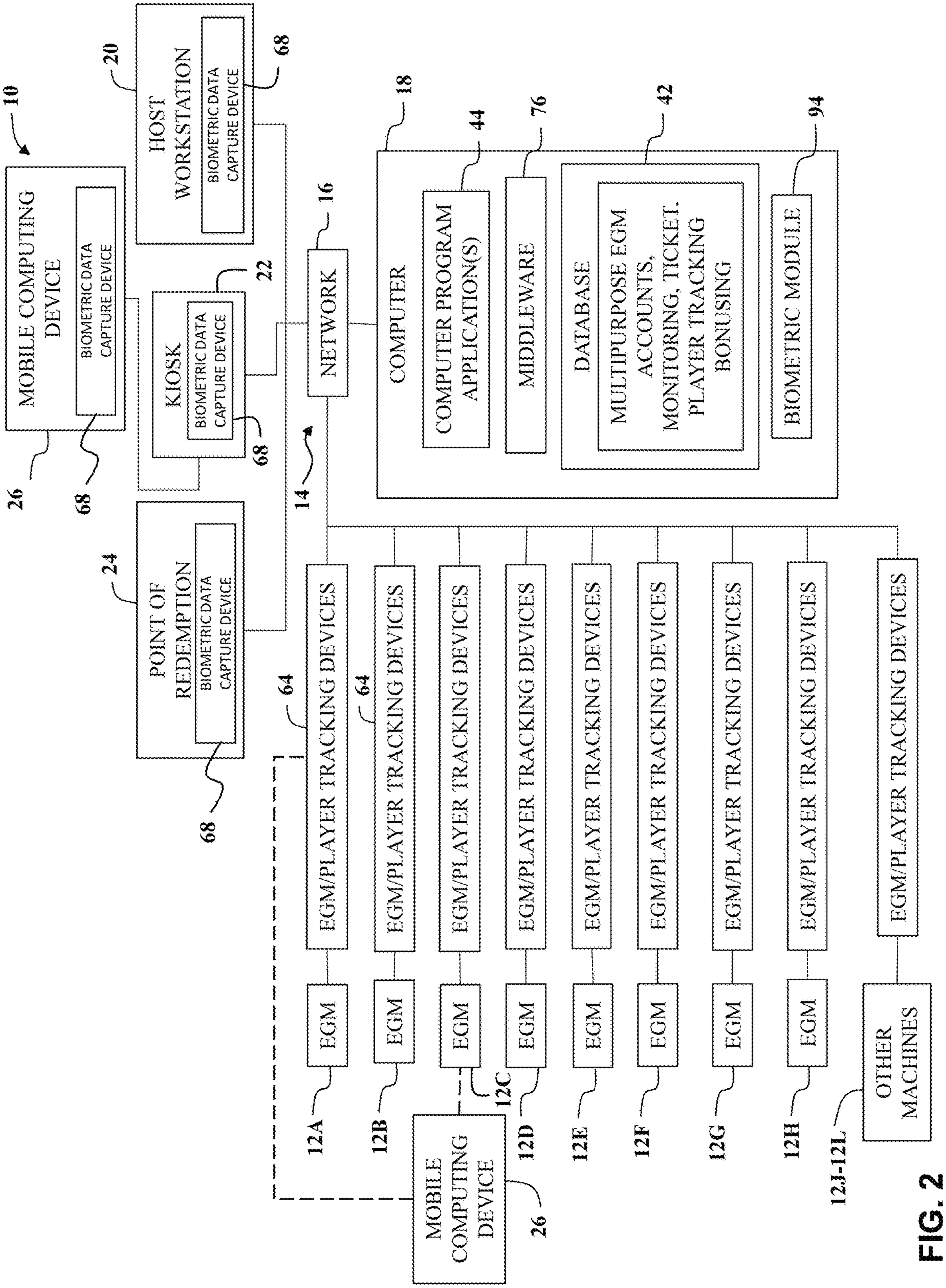

With reference to the drawings, and in operation, the present invention improves the function of known casino management systems by providing a networked casino management computer system 10 (shown in FIG. 1) that uses biometric data to detect occupancy of patrons within a casino environment, such as, for example, patrons at gaming machines, gaming tables, kiosks, and/or any other casino establishment area. In addition, the system 10 may use biometric data, such as facial recognition, to allow patrons to log-in to current player tracking accounts and/or to create anonymous player tracking accounts. The present invention may allow patrons to access player tracking account information using biometric data transmitted using biometric data capture devices. The biometric data capture device may be located anywhere throughout the casino environment. For example, the biometric data capture device may be located at a gaming machine, a table game, a casino entrance, a host stand, etc. The system is configured to monitor patron wagering activity of both current patrons and anonymous patrons at a casino and provide bonus awards to the patrons and the anonymous patrons based on the wagering activity.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

Referring to FIGS. 1-4, in the illustrated embodiment, the networked casino management computer system 10 includes a facial recognition system 2 and a casino management server 18 such as, for example, SYNKROS™ available from Konami™. The casino management server 18 is coupled in communication with a plurality of gaming devices 12 located within a casino property. In some embodiments, the gaming device 12 may include, but is not limited to, electronic gaming machines (EGMs) including slot machines, electronic table games (ETGs), video slot machines and video gaming machines, a kiosk, a gaming table, electronic gaming table, a table games dealer computing device, and/or a mobile computing device such as, for example a smartphone and/or tablet computer.

The facial recognition system 2 includes a facial recognition server system 4 that is coupled in communication with a plurality of imaging devices 6 such as, for example, internet protocol cameras (IP cameras) positioned within the casino property. The facial recognition server system 4 is coupled to a biometric database 7A, 7B (shown in FIGS. 11A, 11B) that includes a plurality of biometric data records. Each biometric data record includes facial image data associated with a facial image of a casino user and a unique face ID. The facial recognition server system is programmed to receive a video image from at least one imaging device of the plurality of imaging devices and access a biometric database including a plurality of biometric data records to retrieve a biometric data record having image data matching the received video image. The facial recognition server system is also programmed to generate and transmit a notification signal to the casino management server 18 that includes a corresponding face ID included in the retrieved biometric data record and an imaging device location ID.

The casino management server 18 is programmed to access a user account database 42 including a plurality of user account records 154 (shown in FIGS. 8A-8B) upon receiving the notification signal from the facial recognition server system 4. Each known user account record includes user information associated with a corresponding casino user, a unique user ID, and a user face ID. The casino management server is programmed to identify a known user account record having a user face ID matching the corresponding face ID included in the received notification signal, identify a gaming device associated with the imaging device location ID, and transmit a session initiation signal to the identified gaming device 12. For example, the casino management server 18 may access an imaging device ID data file 9 (shown in FIG. 10) being stored in the database 42 that includes imaging device IDs associated with gaming device IDs and corresponding gaming device IP addresses, select a gaming device ID and gaming device IP address associated with the received imaging device ID, and transmit the session initiation signal to the gaming device IP address. The session initiation signal includes instructions which cause the identified gaming device 12 to initiate a gaming session to monitor corresponding user activity and transmit gaming session information to the casino management server 18. The casino management server 18 then modifies the known user account record to include a unique session ID and the gaming session information received from the identified gaming device 12.

Figure 33A:
FIGS. 33A-33C are graphical displays of employee menus that may be displayed by the system shown in FIGS. 1-4 when operating a gaming device in Employee Mode, according to an embodiment of the present invention.
Figure 33B:
Figure 33C:
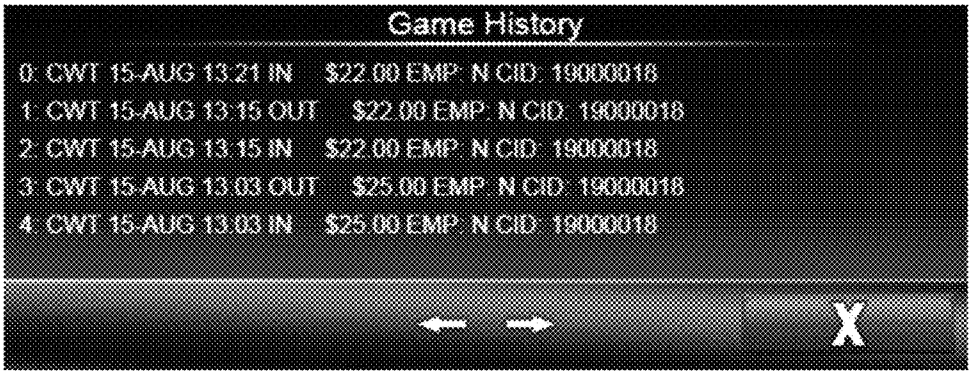

The casino management server 18 may also identify the user as a casino employee (e.g. slot technician) at an identified EGM 12, and transmit a signal to the identified EGM 12 to cause the EGM to operate in an "Employee Mode". For example, as shown in FIGS. 33A-33C, as a patron is currently playing an EGM 12, a casino employee may enter the video image captured by the corresponding imaging device 6. Upon receiving an additional faceID from the facial recognition server system 4, the casino management server 18 accesses the user account records 154, and identify a user account record 154 matching the received face ID 114 and being associated with the casino employee. Upon identifying the casino employee, the transmits a signal to the identified EGM 12 to switch to Employee Mode and display a plurality of employee operation menu pages 510, 512, 514 on the display of the EGM 12 and/or player tracking device to enable the casino employee to access the casino management server 18 to perform a variety of tasks.

For example, if the machine is idle, the system 10 may recognizes the employee and switch to Employee Mode. If a player was still playing the game, the system 10 may recognizes the employee and require the identified employee to press a button on the player tracking unit before switching to Employee Mode. Employee Mode would recognize the employee via facial recognition whose record is also stored in the casino management system. The employee then performs their duties (i.e., acknowledges the jackpot, services the EGM with new tickets, clears the jam, start drop/end drop . . . any of the employee functions). The employee then presses a button on the player tracking unit to switch back to player mode (e.g. normal gaming mode for the EGM).

In some embodiments, the facial recognition server system 4 includes a central hub facial recognition server cluster 8A and an edge facial recognition server cluster 8B. The facial recognition server system 4 is coupled to a historical biometric database 7A (shown in FIG. 11A). The historical biometric database includes a plurality of historical user biometric data records that include facial image data and unique face IDs associated with all known casino users (e.g. all casino patrons, casino employees, hosts, contract operators, etc.) having corresponding user account records. The edge facial recognition server cluster 8B is coupled to a fast lookup biometric database 7B (shown in FIG. 11B) that includes a cache of current user biometric records that are associated with patrons currently located within the casino property. The current user biometric records are selected from the historical user biometric data records included in the historical biometric database.

In some embodiments, the edge server cluster 8B would contain a biometric database of current customers 7B (i.e., face ID which matches a user ID). This is for quick lookup/matching. For example, it is initially populated and maintained as using the below logic: (I) Hotel Reservations—if a known player is checked in, a copy of the face ID biometric record is moved to the Edge Server Cluster for faster lookup; (II) POS or Edge system purchase with card/Face, a copy of the face ID biometric record is moved to the Edge Server Cluster for faster lookup; (III) Player signed up in the players club. Face ID biometric record is added to both the Edge and Central Hub server clusters as well as casino management server 18. Face ID to user ID connection is recorded in casino management server 18; (IV) Player's first cards in (i.e., initial Facial recognition lookup from the "Central Hub Server Cluster biometric database") a copy of biometric record is moved to the "Edge cluster" and kept there for XX hours. Records will age out after XX hours if no additional play recorded; (V) If integrated with NEC surveillance (i.e., casino entry cameras, Hotel cameras, parking camera, etc.), a copy of biometric record is moved to the "Edge cluster" and kept there for XX hours. Record will age out after XX hours if no additional play recorded; (VI) Potential Geofencing, if SYNKConnect™ Mobile application (i.e., player cell phone app), is detected, a copy of the face ID biometric record is moved to the Edge Server Cluster for fast lookup; (VII) There is logic to "age" out biometric data to keep the "Edge Server Cluster" small such as, player hasn't performed a transaction in XX hours. The edge cluster server is used for quick look up for the initial "card in" and subsequent "card in" at other EGMs, table games and to validate the player is still playing at the EGM or table game.

The central hub server cluster 8A may also associate the captured images during enrollment as well as anonymous enrollment at the EGM/Table and stores it in the hub server database 7A. In addition, the central hub server cluster 8A creates a facial template for those images and stores the facial template in the database 7A as well. The combination of face ID and facial template is sent to the edge server cluster cache for pre-processing the images received from the cameras. Similarly, when the player is identified as in the property, the central hub server cluster 8A will send the face ID/Face Template to the edge server cluster for storing in the cache.

In some embodiments, the edge facial recognition server cluster 8B is programmed to receive the video image from the imaging device and generate user facial recognition image data based on the received video image. The edge facial recognition server cluster 8B then accesses the fast lookup biometric database and determines whether the fast lookup biometric database includes a current user biometric record having facial image data matching the generated user facial recognition image data. The edge facial recognition server cluster 8B then transmits the notification signal including the face ID included in the identified current user biometric record and the imaging device location ID to the casino management server 18, upon identifying a matching current user biometric record. The casino management server 18 then uses the face ID included in the identified current user biometric record to identify the known user account record.

The edge facial recognition server cluster 8B may also be programmed to transmit the generated user facial recognition image data to the central hub facial recognition server cluster 8A if the fast lookup biometric database does not include a matching current user biometric record. The central hub facial recognition server cluster 8A then accesses the historical biometric database and determines whether the historical biometric database includes a historical user biometric record having facial image data matching the generated user facial recognition image data.

If the central hub facial recognition server cluster 8A identifies a matching historical user biometric record, the central hub facial recognition server cluster 8A then transmits the historical user biometric record to the edge facial recognition server cluster. The edge facial recognition server cluster 8B is programmed to generate and store a corresponding current user biometric record in the fast lookup biometric database including the face ID and image data included in the historical user biometric record received from the central hub facial recognition server cluster 8A. The edge facial recognition server cluster 8B then transmits the notification signal including the face ID included in the corresponding current user biometric record and the imaging device location ID to the casino management server 18 for use in identifying the known user account record.

The central hub facial recognition server cluster 8A may also be programmed to generate a new historical user biometric record including a new face ID and image date, upon determining that the historical biometric database does not include a historical user biometric record having facial image data matching the generated user facial recognition image data received from the edge facial recognition server cluster 8B. The central hub facial recognition server cluster 8A may then transmit the new historical user biometric record to the edge facial recognition server cluster 8B for use in generating a new current user biometric record stored in the fast lookup biometric database. The central hub facial recognition server cluster 8A may also be programmed to transmit the new face ID and the imaging device location ID to the casino management server 18 for use in generating an unknown patron account record. The casino management server 18 may then transmit the session initiation signal to the identified gaming device including instructions which cause the identified gaming device to initiate a gaming session to monitor corresponding user activity and to transmit gaming session information to the casino management server 18 for use in modifying the unknown patron account record to include the gaming session information.

In some embodiments, the edge facial recognition server cluster 8B may include facial recognition logic that is used to pre-process the image (i.e., crop it, select the closest face, do the match on the various points of the face to ensure it is the best image to validate against the biometric database with the high percentage match potential). The edge facial recognition server cluster 8B may also be programmed to request the cameras to capture images at a static rate (1 or 2 FPS). This image will be constantly passed over to the edge server. The edge server will process these images from the same camera continuously. First of this logic is to identify if this is a live image or a photo shown in front of the camera. Once identified as a live image, it is compared to previous image to see if it has changed. If not changed (same player is still playing) then no further processing is done. If the image has changed, then based on a configuration of x subsequent captures to confirm that the player has actually changed (and not stepped out momentarily from the view of the camera or turned to the side to have a conversation or a drink), the closest image is matched against the face templates stored in the Edge server cache. The facial recognition logic also determines the closest face to the EGM and uses image to send for facial recognition to the Edge/Hub clusters.

For anonymous players at the EGM (e.g., players that don't have existing in the Edge or Hub clusters biometric databases, the system 10 has the option of generating a biometric record, assigning a user ID for the face ID=PATRONID match, adding the record to casino management server 18 and the Edge/Hub cluster biometric databases. Then tracking/Bonusing that player for any play they have on either EGM's or Table Games. After a predetermined number of days, the system 10 may purge the record. Also, casino management server 18 has the ability to convert an anonymous or "refused name" player into a known player. The system 10 may merge the anonymous player records to the newly created known player so all play history is added. Often all the points are also added to the new tracked players account as a benefit.

In addition, the system 10 may still issue cards for time the player plays for the current day, the player cards in, face ID match is found, a copy of biometric record is moved to the edge server cluster and kept there for a predefined period of time. On subsequent card in events (i.e., player plays their second EGM for the current day), the casino management server 18 may automatically welcome them so they don't have to card in because a match was found faster than they could card in on the second and subsequent EGMS (or tables).

In some embodiments, the casino management server 18 may identify the gaming device associated with the imaging device location ID as an EGM including a player tracking device and a player card reader. The casino management server 18 may be programmed to transmit a player login-signal to the EGM including instructions that cause the EGM to display a player log-in screen prompting the player to insert a player card including a user ID embedded thereon into the player card reader. The casino management server 18 then receive the user ID from the EGM, and transmits the session initiation signal to the EGM upon determining the received user ID matches the user ID included in the identified known user account record.

In addition, the edge facial recognition server cluster 8B may request an image at predefined intervals (e.g. 1 frame (image) per second), so every second, the image is sent for a match to validate the same player is in front of the EGM. the casino management server 18 also knows if there are credits on the EGM which indicates the same player is still playing just in case the percent match is lower (i.e., the person looked away from the EGM).

For example, during operation, as a player walks-up, and sits down in front of slot machine. The face is captured by the biometric data capture device and searched at the Edge Server Cluster against players who are known to be present today. If the person is not found, it is sent to the Central Hub Server Cluster for matching against the full database of carded and uncarded players. If no match is found, a new anonymous enrollment is triggered, and linked with the casino management server 18 pseudo player profile. The face template is sent back to edge server cluster for use in 1:1 matching to continuously authenticate player. Every second, a new face is captured and matched at the "Edge Server Cluster" to check that the player is still present. Data on player presence is sent back to the casino management server 18.

The casino management server 18 may also be programmed to transmit lock-out instructions to the EGM upon determining that the patron is not authorized to use the EGM, the lock-out instructions cause the EGM to operate to prevent the patron from operating the EGM. For example, the casino management server 18 may include functionality to send the EGM (SAS, G2S, X-Series, QCOM, or other suitable EGM protocols) the command to lock the game. Thus for Self-Barred/Casino Barred players, once the face match is completed, the system can lock the game or alert the table games dealer, and send alerts to Surveillance.

In one embodiment, the casino management server 18 may identify the gaming device associated with the imaging device location ID as a table games dealer computing device associated with a gaming table. The casino management server 18 may then be programmed to transmit a verification signal including a video image of the patron included in the identified known user account record and instructions that cause the table games dealer computing device to display the video image of the patron and prompt the dealer to verify the presence of the patron a the gaming table. The casino management server 18 may then transmit the session initiation signal to the dealer computing device, upon receiving verification of the presence of the patron at the gaming table.

For example, the casino management server 18 may use facial recognition to create a list of players for the table games dealer to choose from when opening their table game rating. The casino management server 18 may also triangulate the positions of the player as well as do facial recognition. The casino management server 18 table rating form will be used to present a list to the deal to manually chose from of all patrons that the cameras have recognized at the table that don't already have rating session opened. The table dealer can than place the patron on the associated position/seat at the table. The casino management server 18 may also notify the dealer when a player with an open session is no longer there, as oftentimes dealers forget to close the rating thus the player continues to earn points/comps.

During operation, as a player walks-up, and sits down at table, the face image is captured by the biometric data capture device and searched at the Edge Server Cluster for player who are known to be present today. If the person is not found, it is sent to the Central Hub Server Cluster for matching against the full database of carded and uncarded players. If no match is found, a new anonymous enrollment is triggered, and linked with the casino management server 18 pseudo player profile. Match result is sent to the casino management server 18 and result is displayed for dealer acknowledgement at table games dealer workstation. The dealer manually opens player session. When player departs, dealer manually closes player session at the table games dealer workstation.

The casino management server 18 may also generate a "refused name player" account for table games. A "refused name player" includes a player record (without name, address, etc.) that is used for table games. A rating is opened for this player (no points). For example, if the "refused name player" reached $10K cash in buy-in or walk-with, an Anti-Money Laundering (AML) record needs to be created and the player must give his/her ID and thus be converted to a known player. Additionally, often the refused name player moves from table to table, so their rating sessions are all recorded to the casino management server 18 "refused name player" play history. The system may purge these records after XX days to keep the number of refused name players small. For example, Dealers between tables can lookup these refused name players and open a rating session for them so comply with AML (i.e., multiple transactions>=$10K cash buy-in or walk-with).

The casino management server 18 may also be programmed to transmit a self-barred notification instruction to the dealer computing device upon determining that the patron is not authorized to play at the casino property. The self-barred notification instruction causes the dealer computing device to display a notification to the dealer notifying the dealer that the patron is not authorized to play at the casino property.

In some embodiments, the system 10 includes a casino host administration workstation 20 that may be operated by casino employees to access and operate the casino management server 18. The casino employees may use the casino host administration workstation 20 to enroll casino users into a patron loyalty program including generating a user account record that may be associated with the patron. For example, the casino management server 18 may be programmed to display a patron account page on the casino host administration workstation 20 to prompt the casino employee to enter user information associated with the patron. The casino host administration workstation 20 may include a camera that may be used to capture the video image of the patron during the enrollment process. The casino management server 18 is programmed to receive the video image of the patron and the user information via the patron account page. The casino management server 18 transmits the video image of the patron to the facial recognition server system 4 for use in generating a corresponding biometric data record and requests a unique Face ID from the facial recognition server 4. The facial recognition server 4 returns a unique Face ID to the casino management server 18, and the casino management server 18 generates a unique User ID associated with the patron and records an association between the unique Face ID received from the facial recognition server 4 and the unique User ID for future matching. The casino management server 18 then generates a known user account record associated with the patron including the received user information, the video image of the patron, the assigned face ID, and the unique user ID. For example, the face ID biometric record is added to Edge and Hub Server clusters and link created between face ID and user ID.

The database 42 may also have existing images of all players historically, for example, if the casino used the driver's license scanner when the player signed up. The system 10 may access all these previously acquired images through the facial recognition engine to initially populate the biometric database. Alternatively, players may be required to use player cards during an initial gaming session, then the face ID to user ID matching could occur and the face ID added to the Edge/Hub clusters and/or databases just like a new sign up.

For example, the player may approach a player club desk to sign up for a new player loyalty account. The player club clerk will get the ID information from the player and use that to enter information into a form on a patron application web-based form. Once ID/Address and other information is captured, the clerk will ask the player to step in front of a camera or a tablet. The clerk will then click a button on patron application web-based form to capture the patron image. The casino management server 18 transmits the captured patron image to the facial recognition server 4 and requests a face ID. The face ID received from the facial recognition server 4 is stored in the user database 42 for future facial matching at machines or tables games. The facial recognition server 4 stores the captured patron image and assigned unique Face ID in the biometric database 7A, 7B for use in future facial recognition matching.

In some embodiments, the casino management server 18 may be programmed to receive a plurality of notification signals from the facial recognition server system including a plurality of imaging device location IDs, and identify gaming devices associated with each of the plurality of imaging device location IDs. The casino management server 18 may then generate a casino property heat map based on a location of each identified gaming device indicating a location of each casino user identified by the facial recognition server and display the casino property heat map on the casino host administration workstation.

In some embodiments, the casino management server 18 may be programmed to communicate and interact with a mobile computer software application that is stored and operated mobile computing device 26 such as a smartphone and/or tablet computer. The mobile computing device may include a camera for capturing video images of a patron, and a processor that is programmed to execute mobile computer software application to display a patron account page prompting a casino employee to enter user information associated with a patron, and to operate the camera to capture a video image of the patron. The processor of the mobile computing device then transmits a face ID assignment request to the facial recognition server system 4. The facial recognition server system 4 may programmed to select a unique face ID, generates a corresponding biometric data record, and transmit the face ID to the mobile computing device. Upon receiving an assigned face ID from the facial recognition server system 4, the mobile computing device then transmits the assigned unique face ID, the video image of the patron, and the user information received via the patron account page to the casino management server 18 for use in generating a known user account record associated with the patron.

For example, a casino mobile host may use a mobile application to sign-up players. The mobile application captures the face image, retrieves a unique Face ID via the System Integration Layer and sends the other the player sign-up details captured (i.e., address, DOB) via the System Integration Layer to update the user database 42. The mobile application sends and stores the face image and Face ID in the biometric database for future facial matching at gaming machines, table games, or other integrated casino amenities such as, for example, point-of-sale, hotel, spa, valet, etc.

In some embodiments, the casino management server 18 may be programmed to initiate a bonus award feature and identify gaming devices associated with the bonus award feature, determine a bonus award value associated with the bonus award feature, and select gaming devices having gaming sessions associated with unknown patron account records. The casino management server 18 may then transmit instructions to the selected gaming devices that cause the selected gaming devices to display, on each selected gaming device, a message notifying the player of bonus award value associated with unknown patron account records, and download the bonus award value to a corresponding gaming credit meter of each selected gaming device associated with unknown patron account records. Additional details of casino management system for providing anonymous player bonusing which may be used in the present invention, are described in U.S. patent application Ser. No. 16/194,692 to Thomas Soukup et al., filed Nov. 19, 2018, titled "Casino Management System with Anonymous Player Bonusing", which is incorporated herein by reference in its entirety.

In one embodiment, the system 10 includes a player tracking device that is coupled to an electronic gaming machine (EGM). The player tracking device includes a biometric data capture device that is configured to capture biometric data associated with both current patrons and anonymous patrons, such as, for example, a fingerprint, a voiceprint, and/or a facial image of the patron, and generate and transmit the biometric data to the system 10. The system is configured to use the biometric data capture device to detect whether a patron is within a predetermined area. The predetermined area may be around a gaming machine, a kiosk, a gaming table, a casino environment, etc. For example, in one embodiment, the biometric capture device may capture biometric data from a patron, such as a facial image, in the predetermined area around a gaming machine. By capturing the facial image, the system 10 may log the patron into the associated player tracking account on the gaming machine. The system 10 uses the captured biometric data to open and close player tracking accounts, for example, a gaming session on the gaming machine may be opened by the patron entering the predetermined area around the gaming machine. Due to the detection of the occupancy of the player at the gaming machine, there is no need for a personal identification number (PIN) to play on the gaming machine. Once the system captures the biometric data, the system may determine whether the biometric data is associated with a current player account or not and track the gaming activity played on the gaming machine. In addition, the system 10 determine whether the biometric data is associated with an anonymous player or not and track the gaming activity played on the gaming machine. If the biometric data is not associated with a current player or an anonymous player, the system 10 may create an anonymous player account and track the data associated with the new anonymous player account. Once the biometric data is paired with an anonymous player account or a new anonymous player account is created the system 10 may track the gaming activity as if the accounts were current player accounts.

In various embodiments, the system uses the biometric data capture device to capture biometric data and pair the biometric data with current and anonymous player tracking accounts. Once the biometric data capture device detects a patron in the predetermined area, the system may determine whether or not the biometric data provided by the patron matches a current player tracking account or not. In order to match captured biometric data with a current player account, the biometric data must meet a configurable degree of accuracy. For example, the system may receive biometric data from a patron within the predetermined area that matches a current player account at an 85% degree of accuracy. The biometric data may meet the configurable degree of accuracy if the biometric data matches the current player account biometric data between 70-99% degree of accuracy. If the biometric data captured within the predetermined area does not match a current player tracking account, the system may create an anonymous player tracking account. For example, the biometric data capture device may capture biometric data that does not match any current player tracking accounts. The system may create an anonymous player tracking account associated with the captured biometric data. The anonymous player tracking account is created to monitor the activity of the new anonymous player and award the anonymous player tracking account bonuses due to any gaming activity, kiosk purchases, etc. If the anonymous player chooses to become a tracked player, the anonymous player may enter more information into the system 10. By entering in additional information, the anonymous player tracking account becomes a current player tracking account.

In another embodiment, once a patron is logged-into a player tracking account, the patron may receive a bonus while playing on the gaming machine. The patron may be a current player associated with a current player tracking account or an anonymous player that is not associated with a player tracking account. The anonymous player may have an anonymous player tracking account created using the biometric data captured at the gaming machine. Once the current player or the anonymous player is recognized on the gaming machine, the system may award a bonus for example, due to play on the gaming machine. The system may set a predetermined amount of time for the player to play on the gaming machine in order to receive the bonus. Once this predetermined amount of time has passed, the system may award cashable credits to the current player and/or the anonymous player that are immediately downloaded to the gaming machine.

The system 10 may associate a plurality of biometric data with both current player accounts and anonymous player accounts. For example, the system 10 may capture facial images, voiceprints, fingerprints, the patron's age, gender, inferred income level (i.e., big ring, suit, jewelry) and/or any other attribute of the patron. In capturing a plurality of biometric data, the system may update both current player tracking accounts and anonymous player tracking accounts. Any tracking data that changes based on behavior is updated for both current player tracking accounts and anonymous player tracking accounts. In addition, the anonymous player age may be estimated by updating the system 10 over time and tracking when the anonymous player makes visits to the casino environment over a long period of time.

In another embodiment, the system may use biometric data to award bonus awards. For example, during the play of a game on the gaming machine the patron may be frowning. The system may recognize the patron is frowning and award the player a bonus to further improve the player's mood while playing. In addition to frowning, the system may use other biometric data to detect a player's mood, for example, but not limited to the patron's posture, movement, voice volume, tone, etc. The system may capture this biometric data for a predetermined amount of time and trigger the bonus award within the predetermined amount of time. For example, the player may be frowning for 5 minutes and the system may award the player a bonus award for 1 minute or until the player is no longer frowning.

In another embodiment, the system may implement the biometric data capture device at a plurality of locations. The plurality of locations may include but are not limited to, a casino environment, a walkway, an entrance, a player club, a host stand, a VIP lounge, an EGM, and/or a gaming table seat. The gaming table may be interchangeable with the gaming machine. The system may use the captured biometric data to begin play at a gaming table and receive bonus awards, such as, promotional chips, during the course of the game. Whether the player is interested in being tracked or not, the system 10 may automatically fill in the captured biometric data to a new anonymous player tracking account at each location. The tracked gaming activity for both current users and anonymous users may be used for table ratings. In another embodiment, the biometric data capture device may detect a patron and automatically populate the user information on the screen, for example at a host stand. The information may help the host stand recognize the patron and award the patron special seating, bonuses, etc., based on the patron tracking account. In addition, the anonymous patron is able to receive a physical comp bonus due to previous gaming activity. For example, the anonymous patron may be a VIP, and once in the VIP lounge, the anonymous patron may receive a comp bonus, such as a free meal.

In another embodiment, the system may identify suspicious activity and report this information for the Anti-Money Laundering (AML) and the Bank Secrecy Act (BSA). If the captured biometric data meets the configurable degree of accuracy, the player (both current players and anonymous players) may be tracked for cash-in and cash-out transactions that exceed a predetermined amount in a given gaming day. Once the cash-in or cash-out exceeds the predetermined amount, for example, such as $10,000 in a given gaming day, a suspicious activity report may be created. The suspicious activity report is automated by the system by supplying the biometric data (i.e. player image) captured on the biometric data capture device along with the total cash-in and cash-out transactions that total over the predetermined amount in a given gaming day.

Referring to FIGS. 1-7, in the illustrated embodiment, the system 10 includes a plurality of gaming devices 12 that are coupled to an entertaining management and monitoring system 14 with a communications network 16. The entertaining management and monitoring system 14 includes a casino management server 18 and is coupled to the plurality of gaming devices 12 for use in tracking patron events at each of the devices 12. In one aspect of the present invention, the devices 12 may be gaming machines 12A-12H, 12I or non-gaming machines 12J, 12K, 12L, such as, for example, point-of-sale (POS) terminals, gaming tables, and/or sports book terminals.

For example, in one embodiment, a non-gaming machine 12J, 12K, 12L, may include a user computer device 12 that is configured to transmit and receive data to and/or from the casino management server 18 to display graphical interfaces to enable a user to interact with and operate the system 10 with the user computing device 12. In the illustrated embodiment, the casino management server 18 is coupled to each user computing device via the communications network 16 that enables each user computing device to access the casino management server 18 over the network 16 such, as, for example, the Internet, a cellular telecommunications network, a wireless network and/or any suitable telecommunication network. For example, in one embodiment, the user computing device 12 may include a mobile computing device e.g., a smartphone that communicates with the casino management server 18 via the cellular telecommunications network and/or the Internet. In another embodiment, the user computing device 12 may include a personal computer, laptop, cell phone, tablet computer, smartphone/tablet computer hybrid, personal data assistant, and/or any suitable computing device that enables a user to connect to the casino management server 18.

In one embodiment, the system 10 and method may be embodied or implemented via an entertaining management and monitoring system 14 which is shown in block form in FIG. 1. The entertainment and monitoring system 14 may include additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT).

As shown, the system 10 includes a plurality of gaming devices 12. Devices 12 may include, but are not limited to gaming machines, electronic gaming machines (such as video slot, video poker machines, or video arcade games), electric gaming machines, virtual gaming machines, e.g., for online gaming, an interface to a table management host workstation 20 for table games, kiosks 22, point of sale or redemption terminals 24, mobile computing devices 26 or other suitable devices at which a patron may interact or access a user or player account. In the illustrated embodiment, eight electronic gaming devices or machines (EGM) 12A-12H are shown. However, it should be noted that the present invention is not limited to any number or type of machines 12. In one embodiment, the machines 12 are organized into banks (not shown), each bank containing a plurality of machines 12.

For example, in one embodiment, a non-gaming machine may include a mobile computing device 26 that is configured to transmit and receive data to and/or from the casino management server 18 to display graphical interfaces to enable a patron to interact with and operate the system 10 with the mobile computing device 26. In the illustrated embodiment, the casino management server 18 is coupled to each mobile computing device 26 via the communications network 16 that enables each mobile computing device 26 to access the casino management server 18 over the network 16 such as, for example, the Internet, a cellular telecommunications network, a wireless network and/or any suitable telecommunication network. For example, in one embodiment, the mobile computing device 26 may include a mobile computing device, e.g., a smartphone that communicates with the casino management server 18 via the cellular telecommunications network and/or the Internet. In another embodiment, the mobile computing device may include a personal computer, laptop, cell phone, tablet computer, smartphone/tablet computer hybrid, personal data assistant, and/or any suitable computing device that enables a user to connect to the casino management server 18.

The mobile computing device 26 may include any suitable device that enables the user to access and communicate with the system 10 including sending and/or receiving information to and from the system 10 and displaying information received from the system 10 to the user. For example, in one embodiment, the mobile computing device 26 may include, but is not limited to, a tablet computer, a smartphone/tablet computer hybrid, a personal data assistant, a handheld mobile device including a cellular telephone, and the like. The mobile computing device 26, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In one embodiment, the mobile computing device 26 (shown in FIG. 5) includes, for example, a smartphone such as an iPhone™. The mobile computing device 26 includes a processor coupled to a memory device, a biometric data capture device 28, and a database for storing various programs and data for use in operating the mobile computing device 26. The mobile computing device 26 may also include a touchscreen display device 30, one or more video image cameras 32, one or more speakers 34, a microphone 36, at least one input button 38, and one or more sensors including, but not limited to, a touch ID fingerprint biometric sensor coupled to the input button 38, a barometer, a three-axis gyro, an accelerometer, proximity sensor, and an ambient light sensor. In addition, the mobile computing device 26 may also include a Wi-Fi antenna, a cellular network antenna, a Bluetooth™ communications device, assisted GPS and GLONASS, a digital compass, and an iBeacon microlocation device.

In the illustrated embodiment, the mobile computing device 26 includes a web browser programmed and stored in the memory device. The processor executes the web browser program to display web pages on the touchscreen display device 30 that includes information received from the entertaining management and monitoring system 14 to enable the user to interact with and operate the casino management server 18. In addition, the mobile computing device 26 may be programmed to store and execute a mobile program application, e.g., a mobile application, that displays a user interface 40 (shown in FIG. 7) on the touch screen display device 30 that allows the user to access the casino management server 18 to retrieve and store information within the database 42 as well as interact with and operate the casino management server 18. In addition, in one embodiment, the system 10 may install one or more mobile application programs in the memory device of the mobile computing device 26. When initiated by the processor of the mobile computing device x, the mobile application program causes the processor of the mobile computing device 26 to perform some or all of the functions of the casino management server 18.

Other types of gaming machines which may be included (see above) are indicated with reference number 12. The devices 12 are connected via a network 16 to one or more host computers or servers 18, which are generally located at a remote or central location. The casino management server 18 is generally located at a remote or central location. The casino management server 18 includes a computer program application 44 which maintains one or more databases 42. In one embodiment, the database(s) are Oracle database(s).

The computer program application 44 and databases 42 may be used to record, track, and report accounting information regarding the gaming machines 12 and players of the gaming machines 12. Additionally, the computer program application 44 and database(s) 42 may be used to maintain information related to patrons including current patrons and anonymous patrons. Each current patron is associated with a current player tracking account and each anonymous patron may be associated with an anonymous player tracking account, described below. It should be appreciated that the term "player" refers to a "current player", a "current patron", an "anonymous patron", "anonymous player", "user" and/or a "patron" as used in the subsequent description.

In general, the machines 12 may be used by a user or player, i.e., to access their player account. For example, a gaming machine 12C is playable by a player. The player may select one of the gaming machines 12C to play and insert a coin, credit, coupon, and/or player tracking card (not shown) into the chosen EGM 12C. Generally, the gaming machines 12C have an associated number of credits or coins required in order to play. In the case of video slot or poker games, the game is played and an award in the form of credits may be awarded based on a pay table of the gaming machine 12. In addition, there may be alternate pay tables, alternate incentives (bonuses), etc. for anonymous players versus known players.

Figure 3:
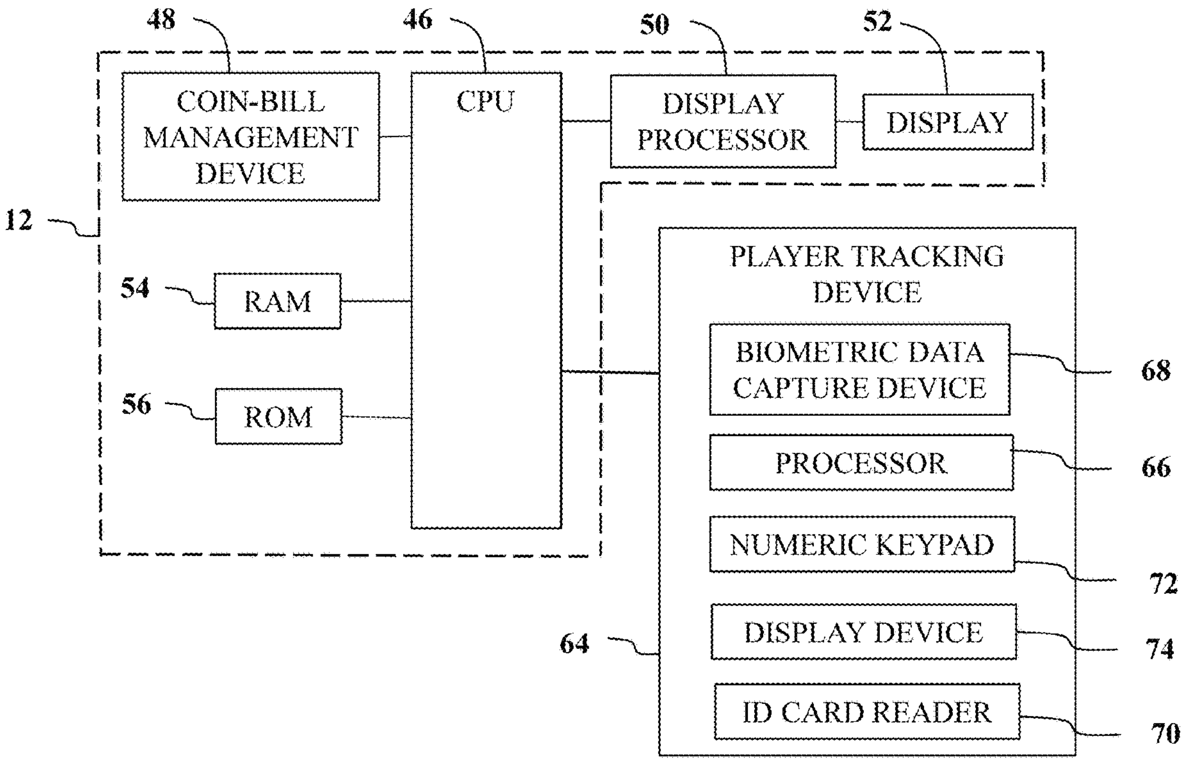
Figure 4:
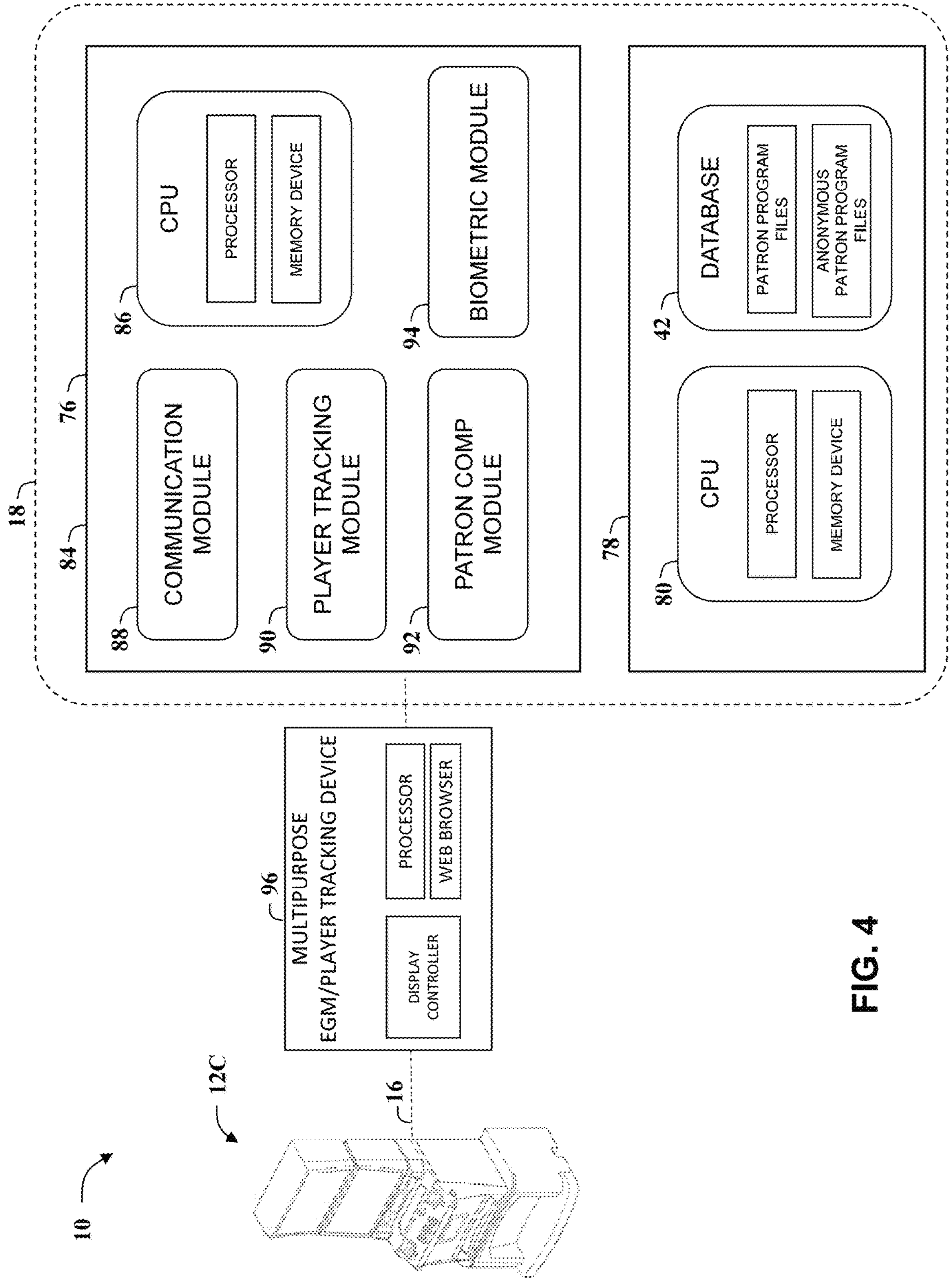
Figure 5:
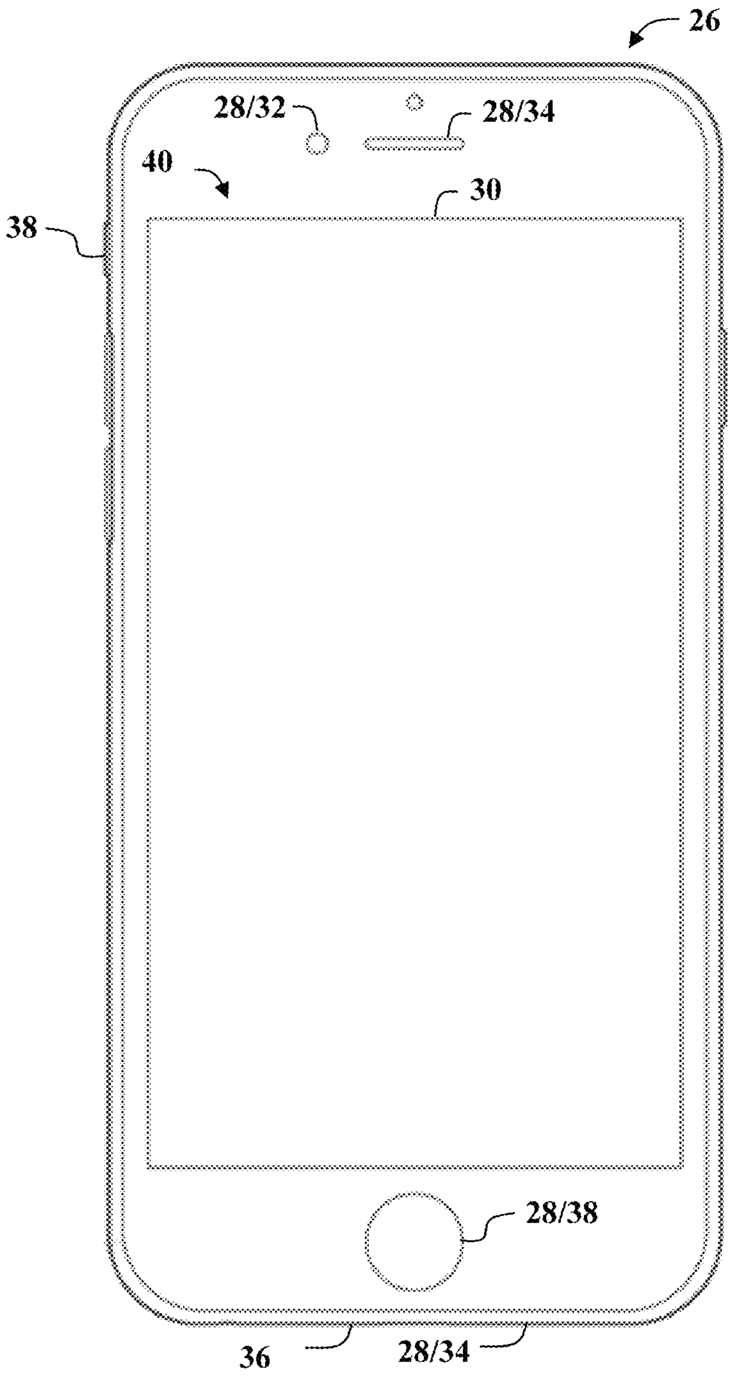
FIGS. 5-6 are schematic illustrations of gaming devices that may be used with the system shown in FIGS. 1-4, according to an embodiment of the present invention.
Figure 6:
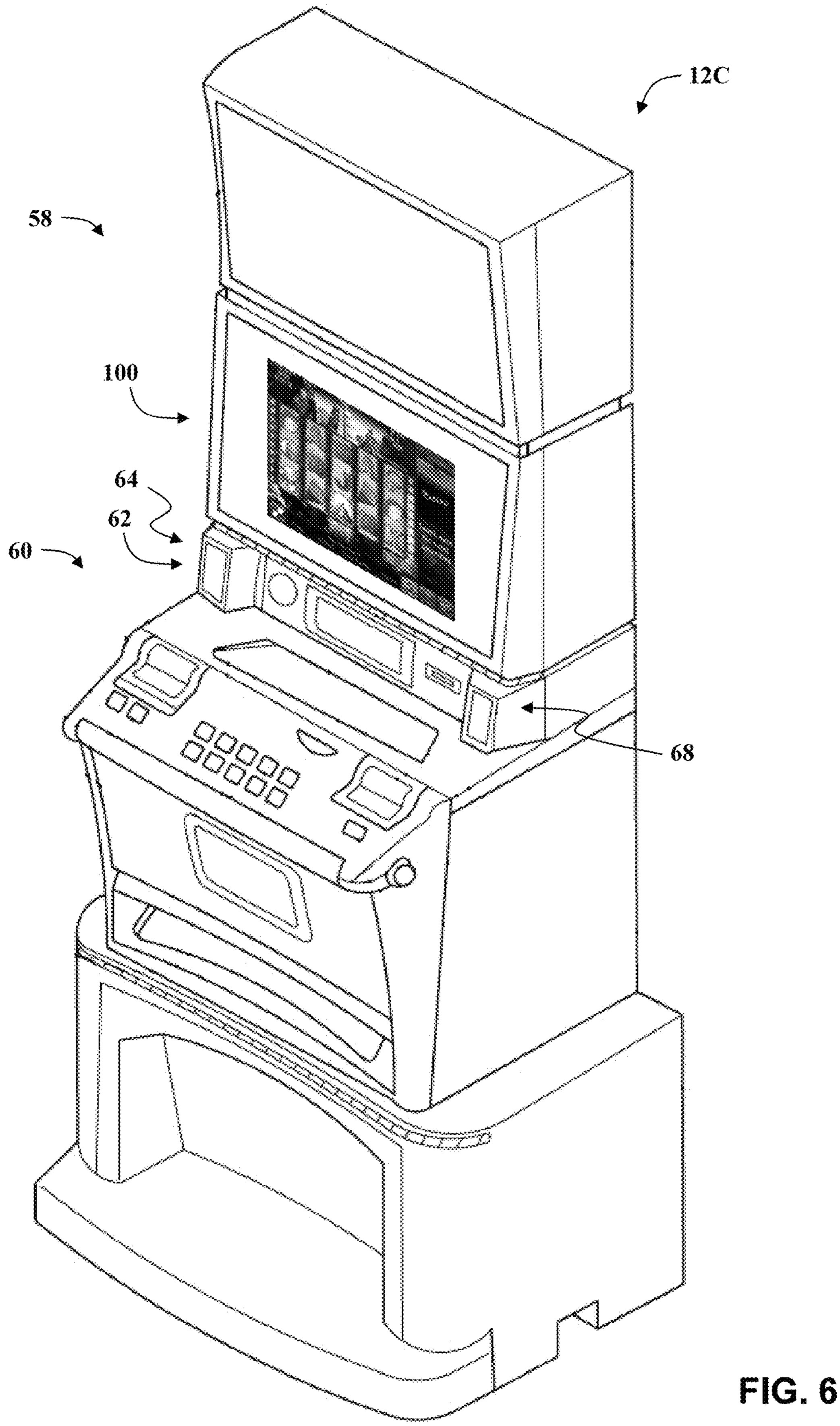

FIG. 3 is a block diagram of a suitable electronic gaming machine 12C. FIG. 6 is a schematic view of the gaming machine 12C. In one embodiment, the gaming machine 12C may be a video gaming machine preferably installed in a casino. The machine 12C comprises a game controller 46, or central processing unit (CPU), a coin-bill management device 48, a display processor 50, a display 52, a RAM 54 as a memory device, and a ROM 56 (generally provided as an EPROM). The CPU 46 is mainly composed of a microprocessor unit and performs various calculations and motion control necessary for the progress of the game. The coin-bill management device 48 detects the insertion of a coin or a bill and performs a necessary process for managing the coin and the bill. The display processor 50 interprets commands issued from the CPU 46 and displays desirable images on the display 52. The RAM 54 temporarily stores programs and data necessary for the progress of the game, and the ROM 56 stores, in advance, programs and data for controlling basic operation of the machine 12C, such as the booting operation thereof, game code and graphics. In addition, the server-side hardware is tasked with the execution of the logic based on the use of the GPU versus the CPU. In another embodiment, the system 10 may have the logic in the camera itself or offload the processing to the SMIB, to a computer in the slot bank, in the IDF (wiring closet), the server room, an off-site cloud, etc.

With reference to FIG. 6, in one embodiment, the gaming machine 12C may be a video gaming machine preferably installed in a casino. In the illustrated embodiment, the gaming machine 12C includes a gaming display 58 for displaying a plurality of games, a user input device 60 to enable a player to interface with the gaming machine 12C, and a gaming controller 62 that is operatively coupled to the gaming display 58 and the user input device 60 to enable a player to play games displayed on the gaming display 58. The gaming machine 12C also includes a cabinet assembly that is configured to support the gaming display 58, the user input device 60, and/or the gaming controller 62 from a gaming stand and/or a supporting surface.

The gaming display 58 and the user input device 60 are coupled to the cabinet assembly and are accessible by the player. In one embodiment, the gaming controller 62 is positioned within the cabinet assembly. Alternatively, the gaming controller 62 may be separated from the cabinet assembly, and connected to components of the gaming machine through a network such as, for example, a local area network (LAN), a wide area network (WAN), dial-in-connections, cable modems, wireless modems, and/or special high-speed Integrated Services Digital Network (ISDN) lines.

In one embodiment, the user input device 60 includes a plurality of input buttons, a coin slot, and/or a bill acceptor. The coin slot includes an opening that is configured to receive coins and/or tokens deposited by the player into the gaming machine. The gaming controller 62 converts a value of the coins and/or tokens to a corresponding amount of gaming credits to establish a credit balance that are used by the player to wager on games played on the gaming machine.

The bill acceptor includes an input and output device that is configured to accept a bill, a ticket, and/or a cash card into the bill acceptor to enable an amount of gaming credits associated with a monetary value of the bills, ticket, and/or cash card to be credited to the gaming machine. Moreover, the gaming machine may also utilize a cashless wagering system (not shown), such as a ticket in ticket out (TITO) system (not shown). In one embodiment, the bill acceptor also includes a printer (not shown) that is configured to dispense a printed voucher ticket that includes information indicative of an amount of credits and/or money paid out to the player by the gaming machine during a gaming session. The voucher ticket may be used at other gaming machines, or redeemed for cash, and/or other items as part of a casino cashless system (not shown).

A coin tray is coupled to the cabinet assembly and is configured to receive a plurality of coins that are dispensed from the gaming machine. One or more speakers are installed inside the cabinet assembly to generate voice announcements and/or sound effects associated with game play. The gaming machine also includes one or more lighting devices that are configured to blink and/or change brightness and color in specific patterns to produce lighting effects to enhance a visual gaming experience for the player.

In one embodiment, the input buttons include a plurality of BET switches for inputting a wager on a game, a plurality of selection switches for selecting a betting line and/or card, a MAXBET switch for inputting a maximum wager, a PAYOUT switch for ending a gaming session and dispensing accumulated gaming credits to the player, and a start switch, i.e., a SPIN/DEAL button to initiate an output of a game.

In one embodiment, the BET switches include five switches from 1BET to 5BET to enable a player to wager between a minimum bet up to 5× minimum bet. Each selection switch corresponds to a betting line such as, for example, a payline and/or symbol for a reel game, one or more cards for a card game, and/or a symbol for a roulette game, to enable a player to associate a wager with one or more betting lines. The MAXBET switch enables a player to input the maximum bet that a player can spend against one play of a game. The PAYOUT switch enables a player to receive the amount of money and/or credits awarded to the player during a gaming session, which has been credited onto the gaming machine. Input to the gaming device 12 may be accomplished via mechanical switches or buttons or via a touchscreen interface (not shown). Such gaming machines 12 are well known in the art and are therefore not further discussed.

The player and/or patron is identified via biometric data, the player tracking card, and/or a player identification number entered into or captured by the player tracking device 64 at each EGM 12. The anonymous player is identified via biometric data. Anonymous player tracking accounts and current player tracking accounts may be used, generally, to provide bonuses to a player, in addition to the award designated by, in the case of a video slot or poker machine, the EGM's 12 paytable. These bonuses may be awarded to the player based on a set of criteria, including, but not limited to, a) the player's play on the machine 12C, b) the player's overall play, c) play during a predetermined period of time, and d) the player's birthday or anniversary (estimated birthday), or e) any other definable criteria. Additionally, bonuses may be awarded on a random basis, i.e., to a randomly chosen player or randomly chosen game. Bonuses may also be awarded in a discretionary manner or based on other criteria, such as, purchases made at a gift shop or other affiliated location.

In one embodiment, the player tracking device 64 includes a processor 66, a biometric data capture device 68 (e.g. IP cameras 6), a player identification card reader 70 and/or a numeric keypad 72, and a display 74. In one embodiment, the display 74 is a touchscreen panel and the numeric keypad 72 is implemented thereon. The player may be identified via biometric data that is associated with a current player account or an anonymous player account. If the captured biometric data is not associated with either a current player account or an anonymous player account, the system 10 may create a new anonymous player account using the captured biometric data. In addition, the player may be identified by entry of a player tracking card into the player identification card reader 70, and/or entry of a player identification number (PIN) on the numeric key pad 72. The player tracking device 64 may also be used to communicate information between the casino management server 18 and the corresponding EGM 12C. The player tracking device 64 may also be used to track bonus points, i.e., incentive points or credits, downloaded from the casino management server 18.

In one aspect of the present invention, each player tracking device 64 is associated with one of the electronic gaming machines 12A-12I. The player tracking devices 64 identify patrons interacting with the system 10 via the biometric data capture device 68, match the captured biometric data at a configurable degree of accuracy with either a current player account or an anonymous player account, and record any gaming activity associated with the matched player account in the database 42.

The casino management server 18 is in communication with the player tracking devices 64 and the non-gaming machines 12J, 12K, 12L for receiving the player tracking data, including any biometric data associated with the patrons and the respective gaming machine 12A-12I from the player tracking device 64 and storing the player tracking data, including the biometric data in the database 42 and, for receiving player tracking data, including biometric data associated with the patrons' use of the non-gaming devices 12J, 12K, 12L and storing the player tracking data, including biometric data in the database 42.

Referring to FIGS. 1-4, in one embodiment, the casino management server 18 includes one or more middleware application server computers 76 and one or more database server computers 78. The database server computer 78 includes a database server processor 80 that is coupled to a database memory device that includes the database 42. The database server processor 80 is programmed to retrieve and store information contained in the database 42. The database 42 contains information on a variety of matters, such as, for example, web pages associated with one or more websites, patron program files (including both current patron program files and anonymous patron program files), patron account information and anonymous patron account information, patron wagering information and anonymous patron wagering information, patron ranking information and anonymous patron ranking information, tier level program files, postal code information, patron comp point value information and anonymous patron comp point value information, patron purchasing information and anonymous patron purchasing information, and/or any suitable information that enables the system 10 to function as described herein.

The middleware application server computers 76 include a patron evaluation server computer 84 that includes a central processing unit (CPU) including an application processor 86 that is programmed to communicate with each of the gaming devices 12 and the database server computer 78. In the illustrated embodiment, the application processor 86 includes a communication module 88, a player tracking module 90, a player comp module 92, and a biometric data module 94. The application processor 86 includes one or more processors that are coupled to a memory device. In addition, the application processor 86 executes various programs, and thereby controls components of the casino management server 18 according to user instructions received from one or more devices 12 and/or the player tracking device 64 to enable users to interact with and operate the casino management server 18. For example, in the illustrated embodiment, the application processor 86 is programmed to receive anonymous player tracking data from one or more player tracking devices 64 and generate the anonymous player tracking account records to monitor the amount of wagers and/or product purchase being made by the anonymous player.

In one embodiment, the system 10 includes a gaming tracking device 96 (SYNKBOX™) that is coupled to the gaming device 12 and the casino management server 18 to receive gaming property services from the casino management server 18 and display the gaming property services on the gaming display 58. Moreover, the gaming tracking device 96 is configured to receive gaming property services from the casino management server 18 and transmit services data indicative of the gaming property services to gaming device 12. In one embodiment, the gaming tracking device 96 is a multipurpose EGM/player tracking device that is connected to one or more gaming machines 12. In one embodiment, the gaming tracking device 96 includes a housing that contains a processor and a display controller configured to control and/or drive the gaming display 58 included with the gaming machine 12. For example, in one embodiment, the gaming tracking device 96 includes a True Time Windows™ computer program that drives a picture-in-picture gaming display 58. Additional details of multipurpose EGM/player tracking devices, which may be used in the present invention, are described in U.S. patent application Ser. No. 12/235,237 to Edward Sepich et al., now U.S. Pat. No. 8,429,229, filed Sep. 22, 2008, titled "Multipurpose EGM/Player Tracking Device and System", which is incorporated herein by reference in its entirety.

The communication module 88 is programmed to communicate with the system devices 12 and/or player tracking devices 64 to facilitate transmitting data over the network 16. The communication module 88 is also programmed to access and retrieve information being stored in the database 42 and transmit information being received from, or generated by, the application processor 86 to the database server computer 78.

In one embodiment, the communication module 88 includes a web-browser program that generates and transmits software code including, but not limited to, HTML, JavaScript, C++, and/or any suitable programming code that enables the gaming machine 12, table management host workstation 20 for table games, kiosks 22, point of sale or redemption terminals 24, and/or other devices 12 to display a website and/or webpages. The communication module 88 may be programmed to host a website including webpages (shown in FIGS. 16-18) that are accessible by a user via one or more client devices 12. The communication module 88 executes a website application program that retrieves code from the database 42 and executes the application code to render one or more webpages on a display device of a client device 12 in response to requests received from the user via the client device 12 to allow users to interact with the website.

For example, in one embodiment, the communication module 88 may be configured to generate and display a web browser interface 98 on a client device 12 such as, for example, the gaming machine 12C, using the gaming tracking device 96. The web browser interface 98 enables a player to access the gaming property services via a website provided by the system 10. In one embodiment, the gaming tracking device 96 is configured to receive webpage data indicative of the gaming property services from the communication module 88 and transmit the services webpage to a gaming machine 12C for use in displaying the services webpage on the gaming display 58. In addition, the gaming tracking device 96 may be configured to transmit information between the patron and the casino management server 18 via the services webpage to facilitate providing gaming property services to the player.

Figure 7:
FIG. 7 is a graphical display that may be displayed by the system according to an embodiment of the present invention.

In the illustrated embodiment, shown in FIG. 7, the casino management server 18 is configured to display a player interaction screen 100 on the gaming machine 12C including a gaming content section 102 and a non-gaming content section 104 using a picture-in-picture display. Moreover, the casino management server 18 displays a game being generated by the gaming controller 62 of the gaming machine 12 within the gaming content section 102 and displays a services website in the non-gaming content section 104. Additional details of the gaming tracking device 96 and system components for use in displaying the player interaction screen, which may be used in the present invention, are described in U.S. patent application Ser. No. 14/488,174 to Jeffrey D. George et al., filed Sep. 16, 2014, titled "System and Methods of Providing Player Services with Gaming Devices", which is incorporated herein by reference in its entirety.

Figure 8A:
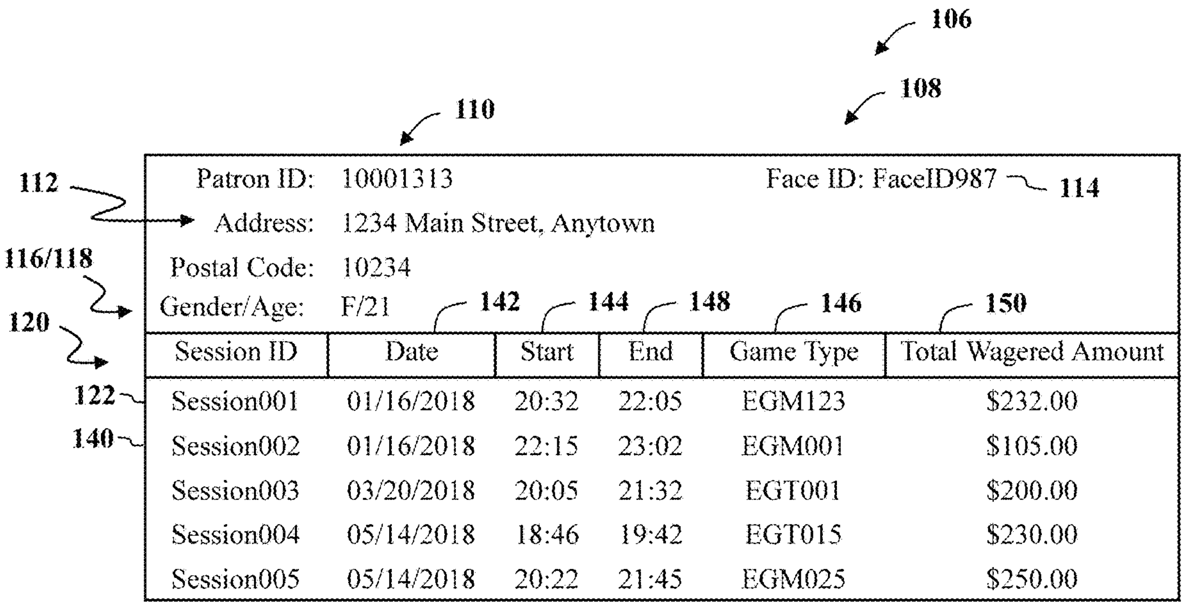

In the illustrated embodiment, the player tracking module 90 is configured to receive player tracking information from one or more player tracking devices 64 and execute a patron program file 106 to generate player tracking accounts for use in storing the information received from the player tracking devices 64. For example, in one embodiment, the player tracking module 90 is configured to generate a plurality of player tracking account records 108 (shown in FIGS. 8A-8B) that are stored in the database 42. Each player tracking account record 108 includes a unique user ID 110 associated with a casino user, address information 112 associated with the casino user including a corresponding postal code, a unique face ID 114 that is associated with the unique user ID 110, gender 116, age 118, and player tracking data 120 that includes information on the amount of wagers and type of games being played by the patron and/or an amount of goods and/or services being purchased by the patron. For example, as shown in FIGS. 8A-8B, each player tracking account record 108 may include one or more gaming transaction record 122. Each gaming transaction record 122 is associated with a transaction being made by the corresponding patron. Each gaming transaction record 122 may include information that indicates a transaction being made by the patron such as, for example, a patron logging into a gaming terminal, a purchase being made at a POS terminal associated with the casino, an amount of wagers being placed with a slot machine, and/or an amount of wagers being placed at a table game.

In the illustrated embodiment, the player tracking module 90 is configured to receive anonymous player tracking information from one or more player tracking devices 64 and execute an anonymous patron program file 124 to generate anonymous player tracking accounts for use in storing the information received from the player tracking devices 64. For example, in one embodiment, the player tracking module 90 is configured to generate a plurality of anonymous player tracking account records 126 (shown in FIGS. 9A-9B) that is stored in the database 42. Each anonymous player tracking account record 126 includes a unique anonymous user ID 128 associated with a casino user, gender 130, age 132, and a face ID 114 that is associated with the unique anonymous user ID 128. Each anonymous player tracking account record 126 also includes player tracking data 136 that includes information on the amount of wagers and type of games being played by the anonymous patron and/or an amount of goods and/or services being purchased by the anonymous patron. For example, as shown in FIGS. 9A-9B, each anonymous player tracking account record 126 may include one or more gaming transaction records 138. Each gaming transaction record 138 is associated with a transaction being made by the corresponding anonymous patron. Each gaming transaction record 138 may include information that indicates a transaction being made by the anonymous patron such as, for example, a purchase being made at a POS terminal associated with the casino, an amount of wagers being placed with a slot machine, and/or an amount of wagers being placed at a table game.

For example, in one embodiment, during operation, both the current patron and the anonymous patron may enter player information at a player tracking device 64 associated with a gaming machine 12 to initiate a gaming session to begin placing wagers on the games being provided by the gaming machine 12. The current patron may enter player information by inserting a player card in to the player tracking device 12, allowing the player tracking device to detect the face ID and/or entering a unique player ID such as, for example, a username and password, or personal identification number (PIN). Upon receiving the current player information, the player tracking module 90 may access the database 42 to identify and retrieve a player tracking account record 108 associated with the player information including the unique user ID 110. The player tracking module 90 may then generate a gaming transaction record 120 including information associated with the gaming session including, but not limited to, a unique session ID 140, a date of the gaming session 142 (also known as a timestamp), a start time 144, and a gaming device type 146 (indicating the type of gaming device 12, e.g. EGM, a kiosk, a gaming table, electronic gaming table, a mobile computing device, etc.). Upon completion of the gaming session, the player tracking device 64 and/or player tracking module 90 receives information associated with amount of wagers being placed by the player during the gaming session and updates the gaming transaction record 120 to include an end time 148 to the gaming session, and total amount of wagers being placed 150.

In another embodiment, the anonymous patron may enter player information, for example, the unique face ID associated with the anonymous player tracking account. For example, the anonymous patron may initiate a gaming session by placing a wager on the games provided by the gaming machine 12 and the biometric data capture device may capture biometric data, pairing the biometric data with a current anonymous player tracking account 126 and pairing the game play with the anonymous player tracking account 126. Upon receiving the anonymous player information, the player tracking module 90 may access the database 42 to identify and retrieve an anonymous player tracking account record 126 associated with the anonymous player information including the anonymous unique face ID. The player tracking module 90 may then generate a gaming transaction record 138 including information associated with the gaming session including, but not limited to, an unique session ID 140, a date of the gaming session 142, a start time 144, and a gaming device type 146. Upon completion of the gaming session, the player tracking device 64 and/or player tracking module 90 receives information associated with amount of wagers being placed by the anonymous player during the gaming session and updates the gaming transaction record 138 to include an end time 148 to the gaming session, and total amount of wagers 150 being placed.

The player tracking module 90 is also configured to execute the patron program file 106 and the anonymous patron program file 124 to generate a user account data table 152 (shown in FIGS. 8A-8B) that is stored in the database 42 that includes a plurality of known user account records 154 and a plurality of anonymous patron account records 156. Each user account record 154 includes information associated with a corresponding casino user including, but not limited to, the unique user ID 110, the unique face ID 114, a patron name, birthdate, total wagers 150, current tier points, tier points to the next tier, date 142, gender 130, age 132, type of user 153, and face size 151. Each anonymous patron account record 156 includes information associated with a corresponding casino user including, but not limited to, the unique user ID 128, the unique face ID 114, total wagers 150, date 142, gender 130, age 132, type of user 153, and face size 151. The anonymous patron account record 156 may be associated with an already established anonymous user ID 128 or a new anonymous user ID 128 may be generated for the anonymous patron account record 156. If the anonymous casino user decides to not be anonymous anymore, the anonymous patron may enter more information into the anonymous patron account record 156, including but not limited to, a patron name, birthdate, and/or a different user ID associated with a current user account record 154. Using the biometric data capture device 68, the anonymous patron's estimated birthday may be updated, for example, the biometric reader may be able to determine when the anonymous player is celebrating a birthday based on captured biometric data. Each player is associated with a specific face size 151 which allows the system 10 to determine the type of user 153. The type of user 153 may be a player or a watcher. The face size 151 has a length and a width of the face. For example, a first patron may be closer to the screen if the length and the width of the first patron face size is larger than that of a second patron face size within the predetermined area. If the face size of the first patron is larger, the system determines that the larger face size is the player and the smaller face size is a watcher.

In addition, the system 10 uses several factors from the face size 151 to determine positioning of the player, determining the player versus the watcher, determining the gender of the player, etc. The factors of each face size 151 include specific dimensions to help determine the positioning, the type of player, and/or the gender. By determining whether the patron is a player or a watcher, the system 10 determines whether the patron is simply looking at the EGM, walking by the EGM without playing, etc. The system 10 uses an algorithm to detect the outer edges of the oval of a face, the eye positioning of the face, the nose positioning of the face, and the mouth positioning of the face (along with relative angles of each).

In various embodiments, the type of user 153 allows the system 10 to provide alternate pay tables, incentives (bonuses), etc., as well as identify particular indicators that may be relevant for marketing analysis. In addition, if an anonymous player is wagering a large amount of money the system 10 may alert a host and/or casino operator to attempt to convert the player to a known player account.

The system 10 may distinguish between a player and a watcher based on a combination of an orientation, a position, and a size of the identified face area relative to the other faces in the display or viewport Similar to that of the anonymous player, an account is created for the water. The watcher tracking account is the same as the anonymous player account except the system 10 does not open a rating to track play of the watcher. The system 10 may track and collect statistical data, such as, but not limited to, which devices associated with the camera ID is being watched by the watcher, at what time, etc.

Figure 16:
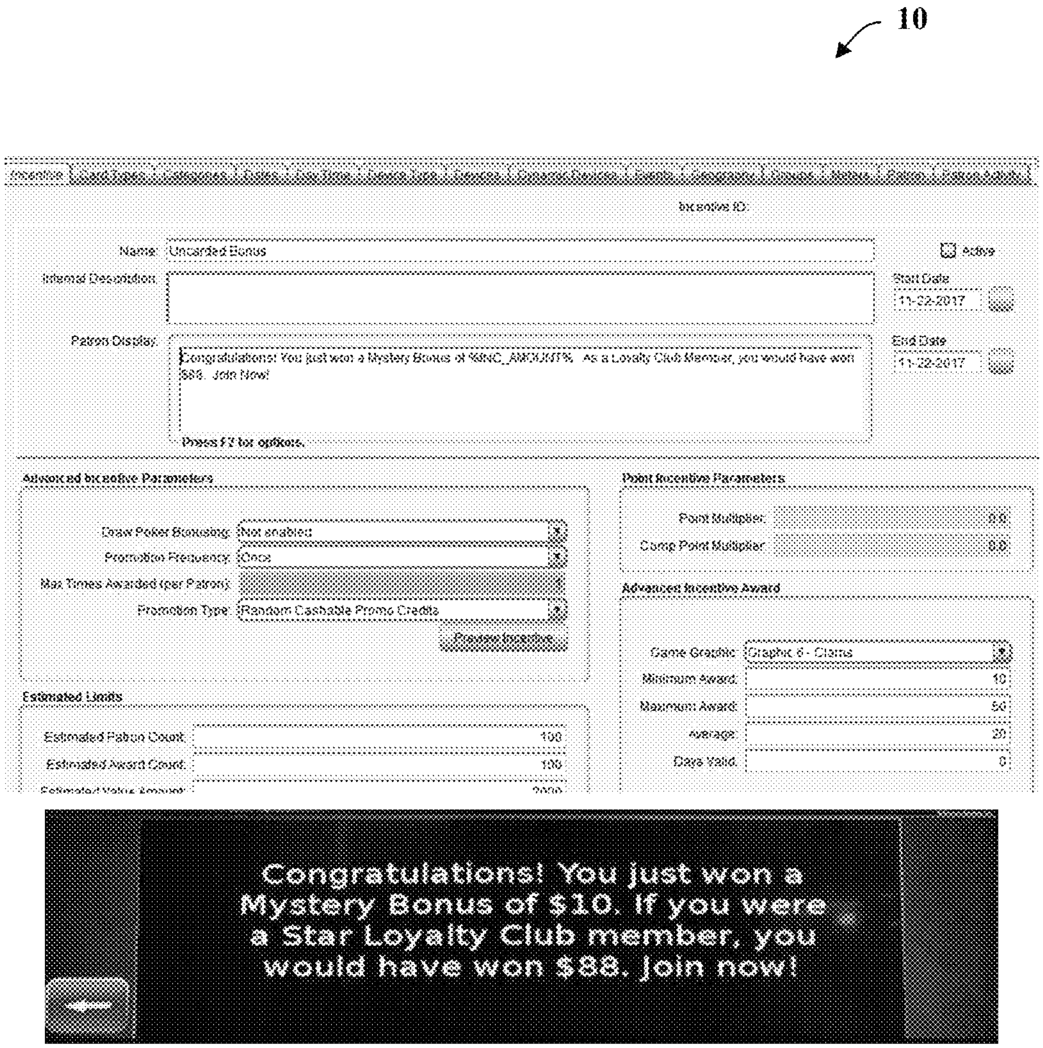
FIGS. 16-18 are graphical displays that may be displayed by the system shown in FIGS. 1-4, according to an embodiment of the present invention.
Figure 17:
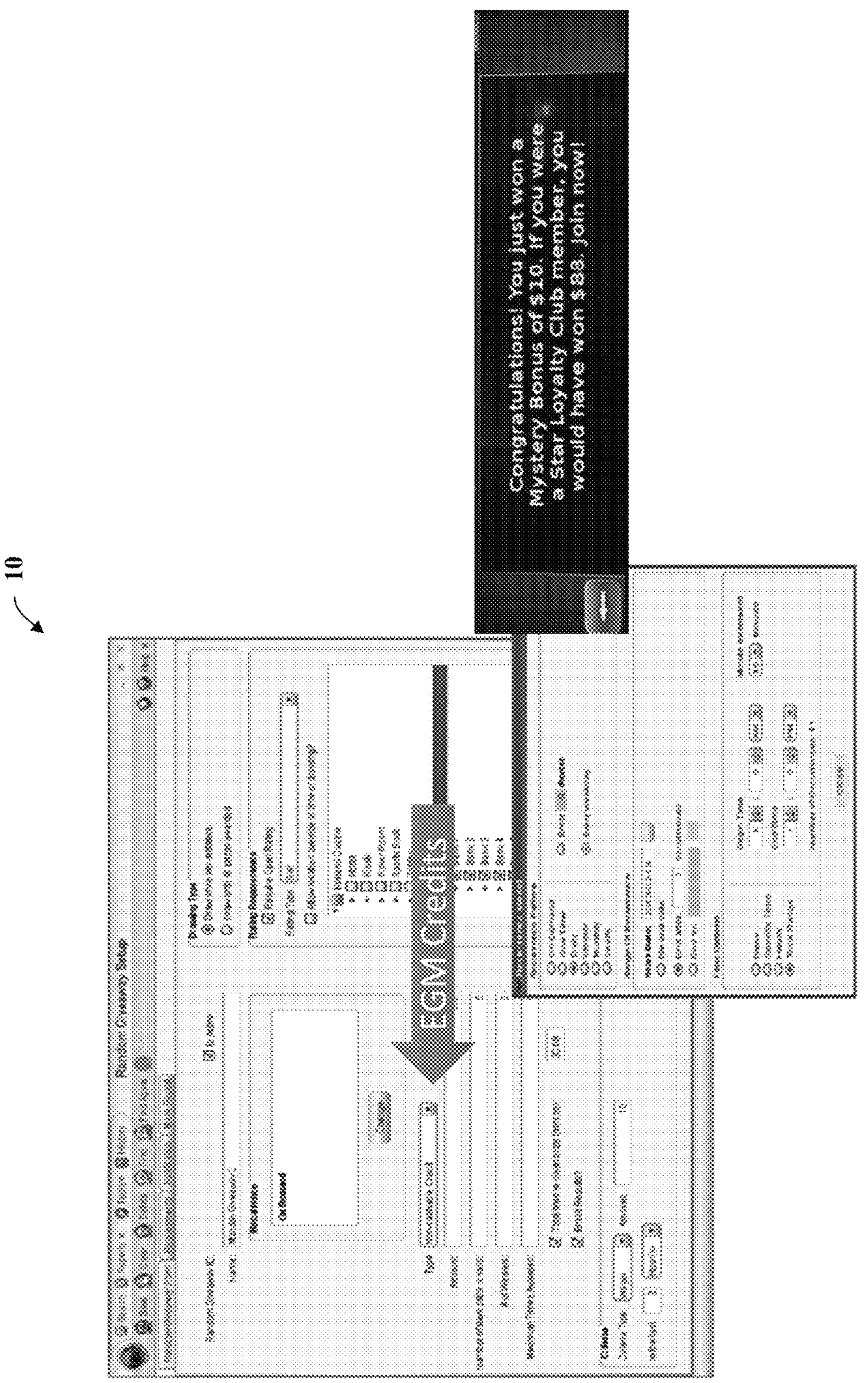
Figure 18:
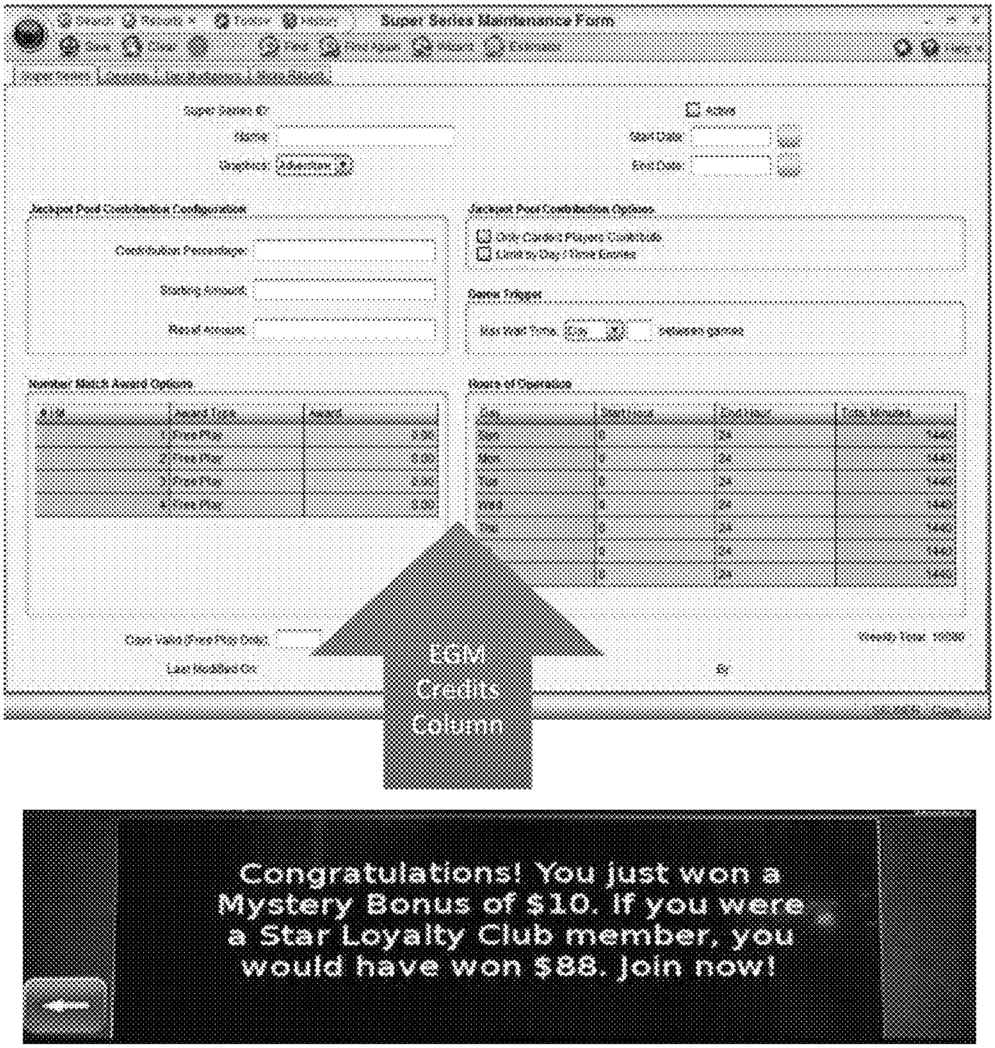

The patron comp module 92 is configured to determine an amount of patron comp awards that may be provided to a patron by the casino based on an amount of wagers being placed and/or an amount of purchases being made by the patron over a predefined evaluation period. In addition, the patron comp module 92 may be configured to determine an amount of anonymous patron comp awards that may be provided to an anonymous patron by the casino based on an amount of wagers being placed and/or an amount of purchases being made by the anonymous patron over a predefined evaluation period, as shown in FIGS. 16-18. Patron comp awards may include, but are not limited to, bonus points, gaming credits, incentive points, and/or any suitable award that may be provided to the patron. For example, in one embodiment, bonus awards may be provided to a player and stored in a corresponding player account for use by the player to purchase goods and/or services offered by the gaming property and/or for placing wagers on games being played on the gaming machine. In one embodiment, bonus awards include bonus points that may include incentive points. Incentive points may be exchanged for game play, gifts and/or property services, such as hats, t-shirts, meals, shows, and/or property amenities such as spa/pool services, nightclub services, valet, VIP gaming area, etc.

In another embodiment, the bonus points may also be convertible gaming credits, which may be designated as cashable or non-cashable. Cashable credits, or incentive points converted into credits, may be downloaded to a gaming machine. When the player has finished playing the gaming machine, any remaining credits may be cashed out, i.e., retrieved as coins or placed on a printed ticket or player tracking card for redemption or play on another gaming machine. In addition, cashable credits may be used to purchase goods and/or services provided by the casino gaming property and/or 3rd party vendors.

Non-cashable credits must be used for game play and/or wagering on games being played with the gaming machine. When the player stops playing a gaming machine, any remaining non-cashable credits which were downloaded to the gaming machine are either lost or uploaded back to the player account. In addition, when the anonymous player stops playing the gaming machine, any remaining non-cashable credits which were downloaded to the gaming machine are either lost or uploaded back to the anonymous player account.

In another embodiment, the biometric module 94 is configured to capture biometric data associated with current patron accounts 108 and anonymous patron accounts 126, and generate and transmit the unique biometric data to the player tracking module 90. The biometric module 94 may include biometric capture components such as, for example, a fingerprint sensor, a video image camera, a microphone, and/or any suitable device for capturing biometric data associated with both a patron. For example, the biometric module 94 may be programmed to detect, capture, and send data indicating a fingerprint of the current patron and/or anonymous patron via the fingerprint sensor, to operate the video image camera to capture images of the current patron and/or anonymous patron, and/or operate the microphone to capture and record a voiceprint of the current patron and/or anonymous patron.

During operation, the patron may enter player information at a player tracking device 64 associated with a gaming machine 12 to initiate a gaming session to begin placing wagers on the games being provided by the gaming machine 12. For example, in one embodiment, the patron may log into the gaming machine 12 by being in a predetermined proximity to the EGM 12. Once the biometric data capture device 68 captures the biometric data, the EGM 12 determines the associated face ID 114 which is associated with the user ID 110/128. Once the system 10 has matched the face data 114 with the associated user ID 110/128, the patron may receive access to the current player account 108/126 associated with the user ID 110/128. The biometric data captured may be matched to either a current player account 110 or an anonymous user account 128. In another embodiment, the EGM 12 may capture biometric data that is not associated with a user ID 110/128. If the biometric data captured is not associated with either a current player account 110 or an anonymous user account 128, the system 10 may then create a new anonymous user tracking account 128. The system 10 may then begin collecting gaming activity, biometric data, etc. to track the new anonymous player.

In another embodiment, the player may initiate a gaming session at a gaming table, and allow a casino employee to enter player information into the player tracking device 64 and/or mobile computing device 26 associated with the gaming table.

Upon receiving the player information for the gaming table, the player tracking module 90 may access the database 42 to identify and retrieve a player tracking account record 108/126 associated with the player information including the unique user ID 110/128. The player tracking module 90 may then generate a gaming transaction record 138 including information associated with the gaming session including, but not limited to, the unique session ID 140, the date of the gaming session 142, the start time 144, and the gaming device type 146. Upon completion of the table gaming session, the player gaming tracking device 64 and/or player tracking module 90 receives information associated with amount of wagers being placed by the player during the gaming session and updates the gaming transaction record 138 to include an end time 148 to the gaming session, and a total amount of wagers 150 being placed.

In one embodiment, the database 42 may also include an action event record list 158 (shown in FIG. 12) that includes a plurality of action event records 160. Each action event record 160 may include a triggering event 162, action event data 164, and the action event 166. The system 10 may initiate the action event 166 once the action event is triggered by the triggering event 162. Once the action event is triggered, the player tracking device 64 and/or the gaming tracking device 96 may transmit the action event 166. For example, if the biometric data capture device 68 receives a user ID 110/128 from the EGM 12, the player tracking device 64 may request the corresponding player account 108/126 from the database 42. Once the player tracking 64 device has verified that the captured biometric data is associated with the user ID 110/128, the player may receive access to the associated player account 108/126. Action event data 164 includes information and data including, but is not limited to, determining corresponding player tracking ID with biometric data and/or transmitting associated player accounts with successful log ins. As shown in FIG. 12, the action event data 164 description may include data associated with the corresponding action record. For example, in one embodiment, the action event data, Action002, the system may determine whether the movement in the predetermined area includes any biometric data. Once the system has detected movement within the predetermined area the EGM 12 may receive an area image of the predetermined area that may include the biometric data. The triggering event may include, but is not limited to, receiving no movement within the predetermined area, detecting the biometric data within the predetermined area, the detected biometric data is associated with a current player account, the biometric data is not associated with a current player account, and the player and/or anonymous player inserts credits at an EGM 12. Once the system 10 initiates the triggering event 162, the triggering event triggers the corresponding action event 166, which will send the action event data 164 to the corresponding device.

The database 42 may also include a player action record list 168 (shown in FIG. 13) that includes a plurality of player action records 170 that are associated with a plurality of players. Each player action record 170 includes the player transaction record 122/138 associated with the corresponding unique face ID 114, the action record ID, the triggering event 162, the action event data 164, and the action event 166. In addition, the player action record 170 may also include information transmitted to the system 10 including data and information to be sent with the player tracking device 64 and/or gaming tracking device 96.

Figure 14:
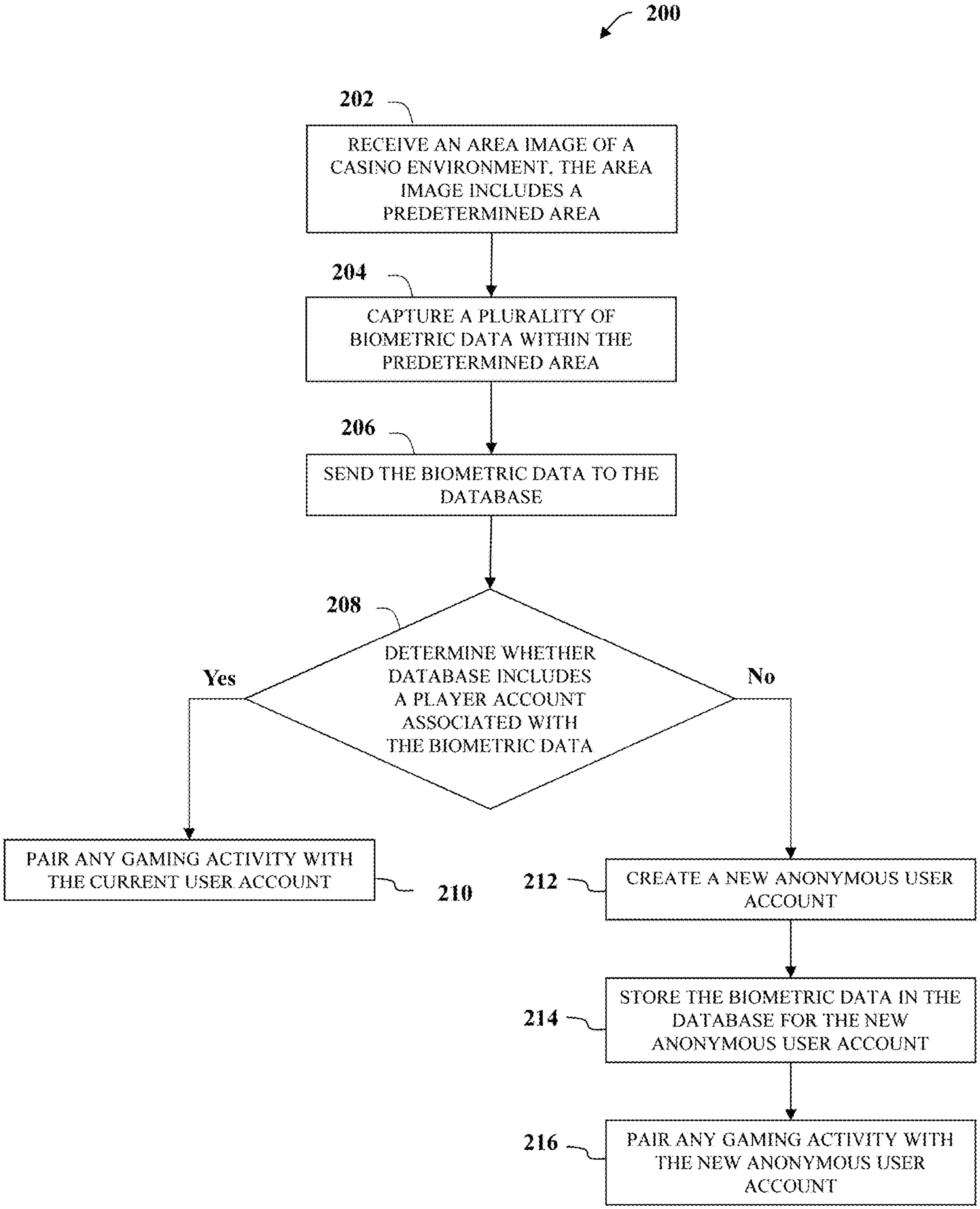
FIG. 14 is a flowchart of an algorithm that may be executed by the system shown in FIG. 1 for providing gaming property services to a user, according to an embodiment of the present invention.
Figure 15:
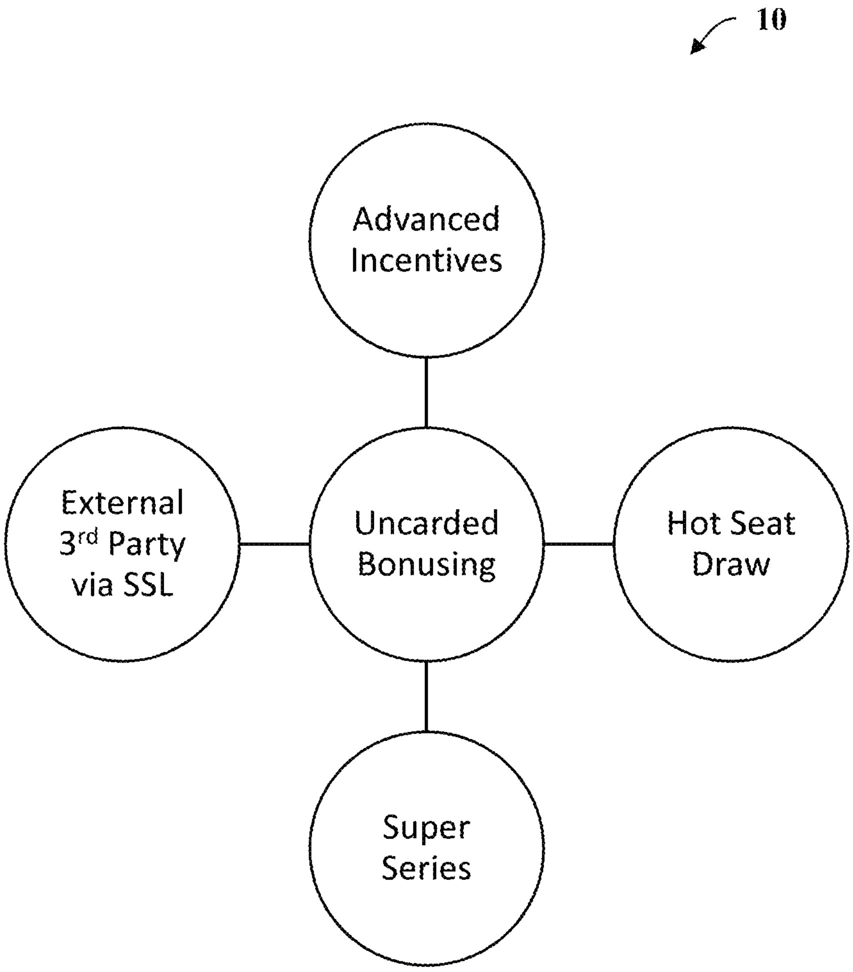
FIG. 15 is an additional diagram of the system shown in FIGS. 1-4, according to an embodiment of the present invention.

FIG. 14 is a flowchart of method 200 including a plurality of algorithm step that are executed by the casino management server 18 for generating information that may be used to provide gaming property services to a casino user. The method 200 includes a plurality of steps. Each method step may be performed independently of, or in combination with, other method steps. Portions of the method 200 may be performed by any one of, or any combination of, the components of the system 10.

In method step 202, the system 10 receives an area image of a casino environment. The area image includes a predetermined area. The predetermined area may be the area around the EGM 12, such as, for example, where a player may sit on a stool in front of the EGM 12, in front of a kiosk to collect money, and/or any other area where a player may disclose biometric data for logging into a player account. The player account may be a current player account 108 or an anonymous player account 126. The casino environment may include the EGM 12, the host workstation 20, the kiosk 22, the POS 24, a store front, the entrance to a casino, etc.

In method step 204, the system 10 captures a plurality of face IDs within the predetermined area. The biometric data may be associated with a player account 108 or an anonymous player account 126. The biometric data includes a face ID 114 which may include, but is not limited to, facial image, retina image, and/or additional biometric data including fingerprint, voice, etc.

In method step 206, the system 10 sends the biometric data to the database 42. In method step 208, the system 10 determines whether the database 42 includes a player account 108 or an anonymous player account 126 associated with the biometric data and/or face ID 114. If the database 42 includes an associated player account, any gaming activity during the gaming session is paired with the associated player account in method step 210. The biometric data is matched to the associated player account at a configurable degree of accuracy. The configurable degree of accuracy may include but is not limited to between 70-99%. For example, the player's facial image must match the face of the current player account 108 at an 80% degree of accuracy.

If the biometric data is not associated with a current player account 108 or a current anonymous player account 126, in method step 212, the system 10 may create a new anonymous player account. During play of the game, any gaming activity may be paired with the new anonymous player account. If the anonymous player has a current player account, the gaming activity may be paired to the current player account by capturing the biometric data associated to the anonymous player account 126. In addition, if the player has a current player account the system 10 may pair the gaming activity with the current player account 108 by capturing the face ID 114 and/or receiving the player tracking ID 110.

In method step 214, the system 10 may store the face ID 114 in the database 42 for the new anonymous player account 126 created for the anonymous player and any gaming activity may be paired with the anonymous player account 126.

In one embodiment, the anonymous player account 126 may be created after a first predetermined amount of time of gaming activity has occurred on the EGM 12 by the anonymous player. The predetermined amount of time may be, for example, five minutes of gaming activity without the player providing a player tracking ID to be paired with a current player account.

In another embodiment, the anonymous player account 126 may be awarded a promotion based on a triggering condition. The triggering condition may be that the system 10 has determined that the anonymous player is celebrating a birthday due to the biometric data within the area image. In addition, the anonymous player may be awarded a promotion based on the gaming activity stored on the anonymous player account 126. The triggering condition may also include a second predetermined amount of time where the anonymous player is awarded a promotion for being logged into the anonymous player account 126 for the second predetermined amount of time. For example, an anonymous player may begin playing a game and stay logged in for 1 hour. The system 10 may award the anonymous player a predetermined amount of credits for staying logged into the anonymous player account for the predetermined amount of time.

In another embodiment, the patron at the EGM 12 may be awarded a promotion based on a predetermined gesture. The predetermined gesture may include, but is not limited to, a facial gesture, a hand gesture, and/or a voice gesture. For example, the current player may be bored and yawn. The biometric data capture device captures the gesture, i.e. yawn, and awards the current player a promotion to keep the player interested.

In various embodiments, shown in FIGS. 15-18, the system 10 may enhance the casino management server 18 Advanced Incentives, Hot Seat Draw and Super Series to Bonus Uncarded players (add credits directly to the EGM/ETG credit meter) and the system 10 may enhance the casino management server 18 adding a command for external Bonusing systems to add credits directly to the EGM/ETG credit meter. By bonusing the uncarded players the system encourages the players to join the club to earn higher awards.

In another embodiment, the system may include an Advanced Incentives uncarded enhancements. The system 10 may add a new promotion type (EGM Credits) with a fixed amount, add a new promotion type (EGM credit random) with a min/max/average, add an uncarded selected box which reduces criteria tabs to date time, device type, and devices, and/or modify patron meters tab for single uncarded rating, which is an amount that is greater than the amount as a trigger.

In one embodiment, the system 10 may include Hot Seat Draw uncarded enhancements. The system 10 may add a new promotion type (EGM credits), add a new promotion type (EGM credit random) with a min/max/average, add an uncarded rating to the rating type, and/or allow for automated scheduling (recurrence).

In another embodiment, the system 10 may include Super Series uncarded bonusing enhancements. The system 10 may add new award type columns for uncarded (EGM credits). In addition, when the super series plays, the system 10 may automatically select 5 numbers for uncarded players. The system 10 may award uncarded players form the uncarded column and players from the carded column and 5 number match still wins the progressive and locks the EGM 12.

Figure 19:
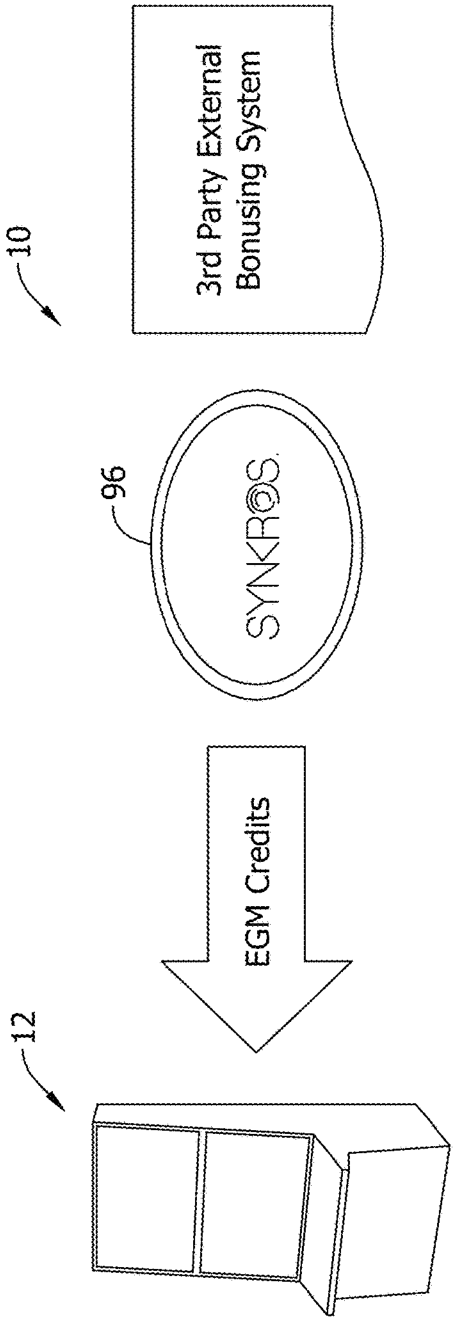
FIG. 19 is an additional diagram of the system shown in FIGS. 1-4, according to an embodiment of the present invention.

In another embodiment, the system 10 may enhance system integration layer uncarded bonusing. The casino management server 18 may control added external bonusing credits to X-Series, Q-COM, SAS, G2S, and/or any suitable EGM protocols through current integration with 3rd Party Jackpot Management Systems (JMS). The system 10 may add external bonus command to the system integration layer that adds credits to the EGM credit meter via the command, as shown in FIG. 19. In addition, the system 10 may add external bonus command to the system integration layer that adds credits to the EGM credit meter via the command. By using the casino management server 18 infrastructure to deliver bonuses from the external bonusing systems, additional hardware is not needed.

Figure 20:
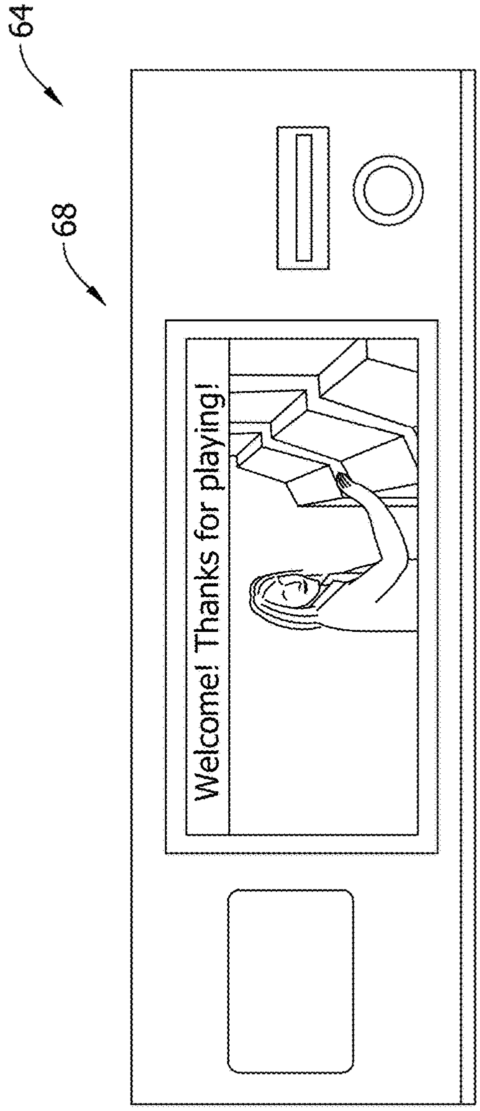
FIG. 20 is a schematic of a player tracking device that may be used with the system shown in FIGS. 1-4.

In another embodiment, the casino management server 18 may rate uncarded (anonymous players). The system 10 may use a biometric data capture device 68, for example, such as, a camera or other means in the player tracking bracket to attempt to do facial recognition of the player, assign an anonymous player account (similar to a patron account; however, with only the player's photo), and a digital signature of the face, as shown in FIG. 20. The system 10 may also assign the uncarded rating to the new anonymous player account (or if based on the signature of the face a match is found) use that anonymous player account.

For Anonymous Player Bonusing the system 10 may be able to add more play criteria metrics to target repeat anonymous players (i.e., depending on the accuracy of the facial recognition signature matching, now that player is more or less tracked just like a carded player).

In addition, for AML and/or BSA, the system 10 may include suspicious activity reporting. Depending on the accuracy of the facial recognition signature matching, now that player is more or less tracked just like a carded player. For cash-in or cash-out transactions that exceed $10,000 in a given gaming day, automate the suspicious activity reporting by supplying the anonymous image captured on the account along with the cash-in/cash-out transactions that total over $10,000 in a given gaming day. The system 10 may add a camera to the player tracking bracket for anonymous player bonusing and AML/BSA suspicious activity reporting through facial recognition.

In various embodiments, the system may use the facial recognition in other use cases. The system 10 may extend to other revenue centers by adding commands to the system integration layer so POS/PMS can validate/lookup facial signatures to bonus or provide high value customers a discretionary comp at POS/PMS (similar to a carded player). In addition, the system 10 may enable behavior bonusing, such as, for example, if a player is frowning for X amount of seconds, the player may receive a bonus as the player is losing and may be ready to leave.

In various embodiments, the system 10 may use additional biometric identification including facial, retina, finger print, voice or other biometric means to identify a player with a degree of accuracy against a database of biometric markers. In addition, a biometric device may sample the face, retina, figure print, voice, etc. to produce a unique biometric marker that is used to compare against a database of previously stored biometric markers to uniquely identify a player with a degree of accuracy. In contrast, a non-biometric identification includes any means of association of a player based on something they have, i.e., their player card, NFC/RFID device, cell phone, license number of their car that is stored in the database and previously associated with the player.

In various embodiments, the system includes wagering devices which are defined as an EGM, table game, iGaming Real-Money gaming session or other gaming device that a player interacts with to perform a wager. In addition, non-wagering device include but are not limited to a point-of-sale, hotel, kiosk, iGaming non real-money gaming session or other non-gaming devices or touch points that a player interacts with as part of the overall player tracking and loyalty program.

In another embodiment, some potential implementations of the system 10 include using a camera or other biometric data capture device 68 at the EGM 12 include using a camera at the EGM 12 to detect occupancy. The casino management server 18 may be modified to allow uncarded (anonymous) player rating logic to open and/or close session rating triggered by detecting if the seat is occupied and credits are being played. The bonusing through the casino management server 18 may be modified for GUI/Bonusing logic to allow operator to set time-on-device and coin-in bonuses. The casino management server 18 may be modified for the award type to be cashable credits immediately downloaded to the EGM 12 (no need for PIN).

In another implementation, the system 10 may implement using the camera at the EGM 12 to enable facial recognition of anonymous players. The system 10 may determine if the player matches a player in the database (facial recognition) prior to opening a player rating. If the player does match (at a configurable degree of accuracy), then assign the session to that User ID. If the player does not match, then create a player (image, biometric, age, gender, inferred income level (i.e., big ring, suit. neckless) or other attributes from the biometric scan. In addition, the system 10 may allow bonusing similar to the prior implementation above, however, now player history meters can be used as the player is an "anonymous tracked player. The camera at the EGM 12 may use facial recognition of both anonymous and known players. For example, if the player does not insert a card, there is no NFC/RFID tap on, the system 10 may run a player biometric scan (i.e., picture of face) against the database of known biometric markers, if yes, (at a configurable degree of accuracy), the system 10 may welcome the player.

In another embodiment, the system 10 may use the camera at the EGM 12 to detect hand or facial gestures. The gesture bonusing may be based on configurable tolerance, i.e., frowning, posture, movement, voice volume, and/or tone, etc., for 3 minutes and a coin-in>X, the player may be awarded a bonus.

In one embodiment, the system 10 may implement the camera at a table seat. The camera at the table seat may be implemented the same or similar to the same as the EGM 12 discussed above. In addition, the bonusing may be provided through promotional chips. If a player chooses to remain anonymous, the system 10 may automatically fill in an image for refused name player in system table ratings.

In another embodiment, the system 10 may implement the use of images (and/or biometric images of anonymous and current players) for AML and/or SAR reporting where the player has a $10K buy-in/walk away with. In another embodiment, the system 10 may use the camera at player club/host/VIP lounges to greet player, including auto population of a customer player form of choice. In one embodiment, the anonymous player may receive bonusing physical comp.

In another embodiment, the system 10 may include a lookup and/or store biometric markers that uniquely identify a player, to the system integration layer. In addition, the lookup and/or store may be implemented at the POS/Hotel, VIP lounge. This may allow the greeting of guests, prepopulate the guests' unexpired comps, offers, etc. In another embodiment, the system 10 may use a surveillance system (VIP on-site) for a 3rd party system to send a biometric marker to the casino management server 18 to confirm a match in the biometric database.

In another embodiment, the system 10 may place a plurality of cameras at all entrances to identify patrons as they enter the property before they engage a gaming device. For example, in the parking lot, parking garage to detect a license plate number associated with a player. Potential implementation with a camera at various walkways/pathways throughout casino or resort to recognize patron via facial recognition include but are not limited to greeting the patron, reminding the patron of upcoming events on their calendar that align with patron preferences, reminding the patrons of offers that will expire soon if not used, especially when greeting points are near the venue of the offer, and/or send the patron on a random scavenger-type hunts. For example, if the patron passes this touch point between 6 and 10 PM, an incentive is just awarded for passing the virtual turnstile.

Figure 21:
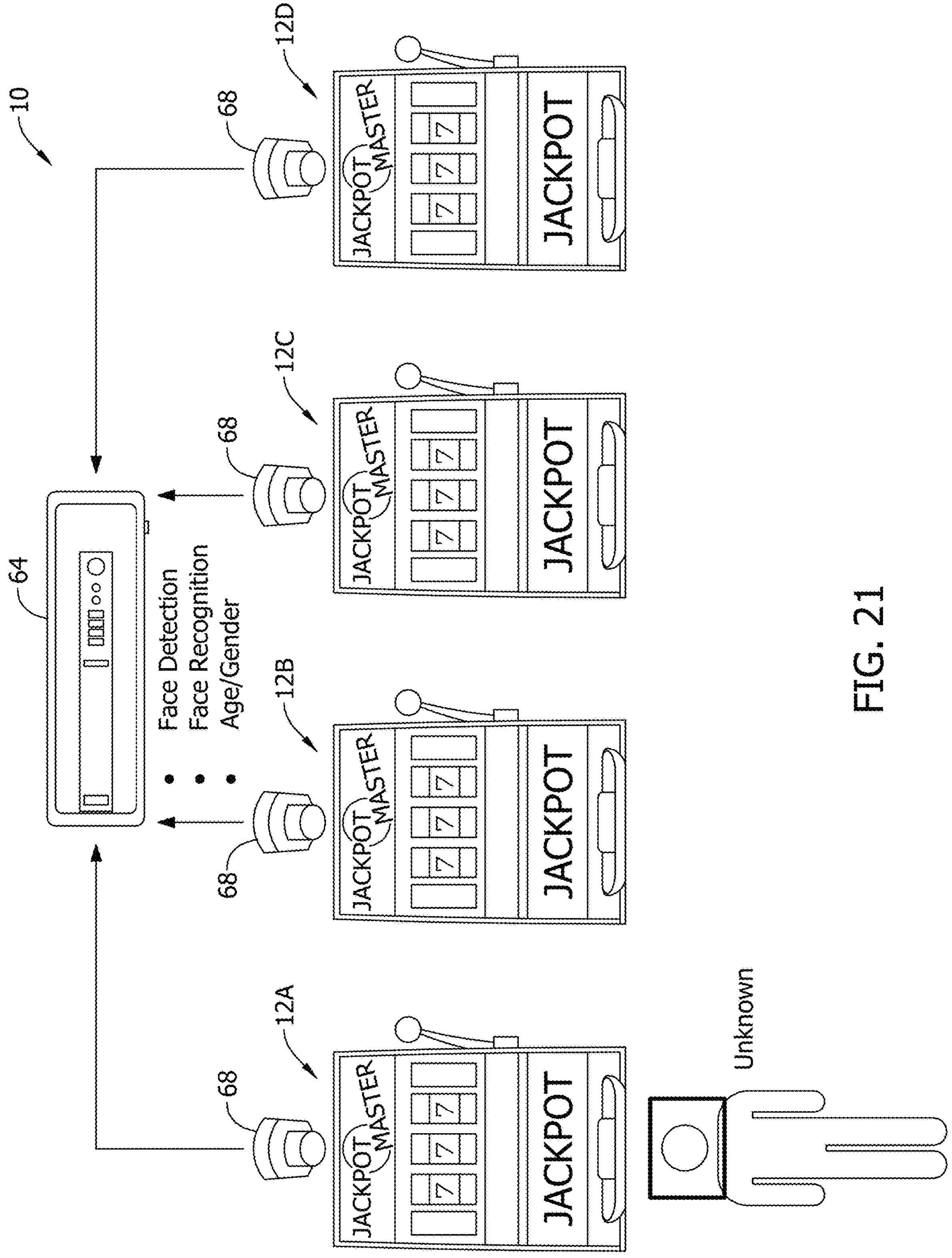
FIGS. 21-24 illustrate a schematic of the casino environment that may be used with the system shown in FIGS. 1-4, according to an embodiment of the present invention.
Figure 22:
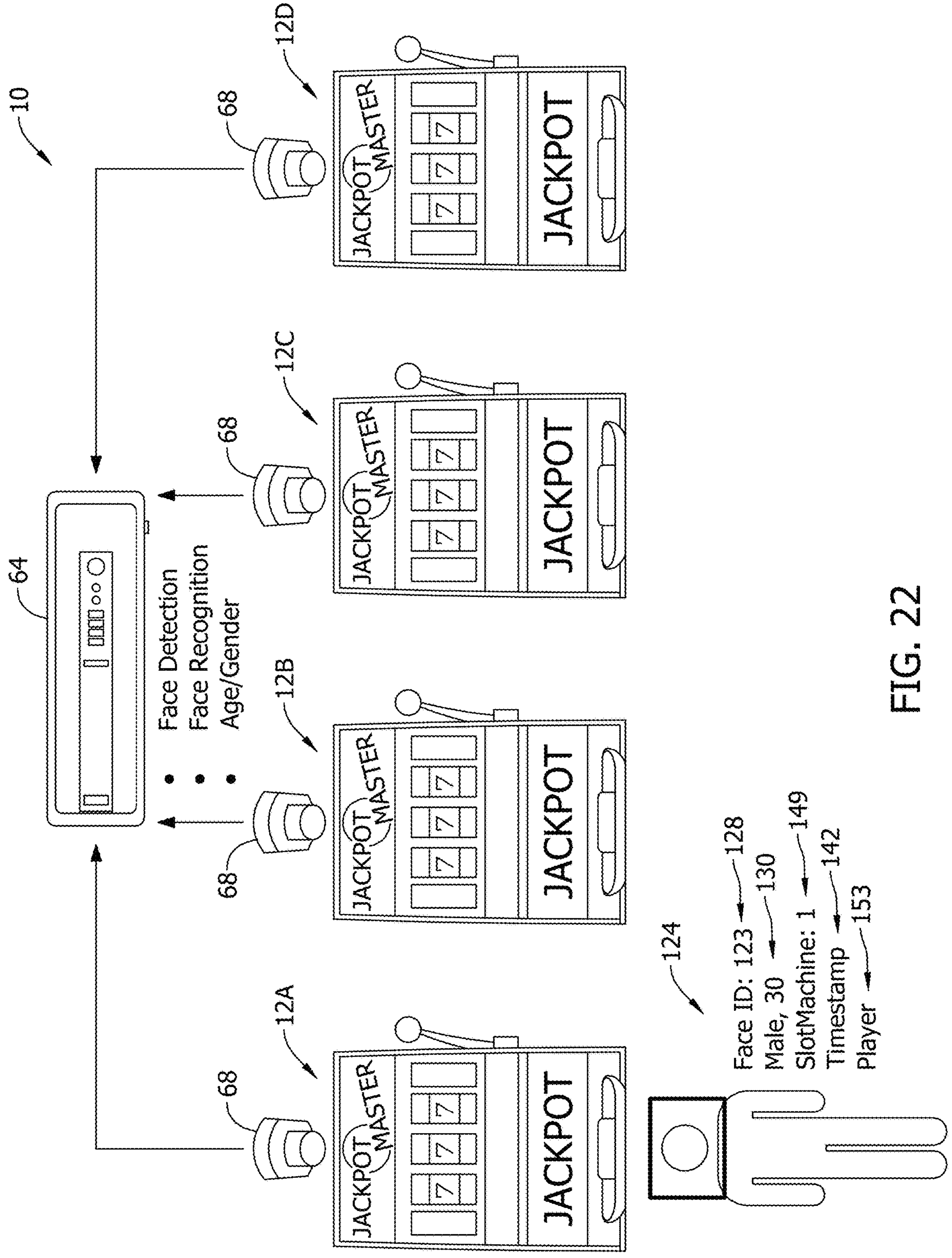
Figure 23:
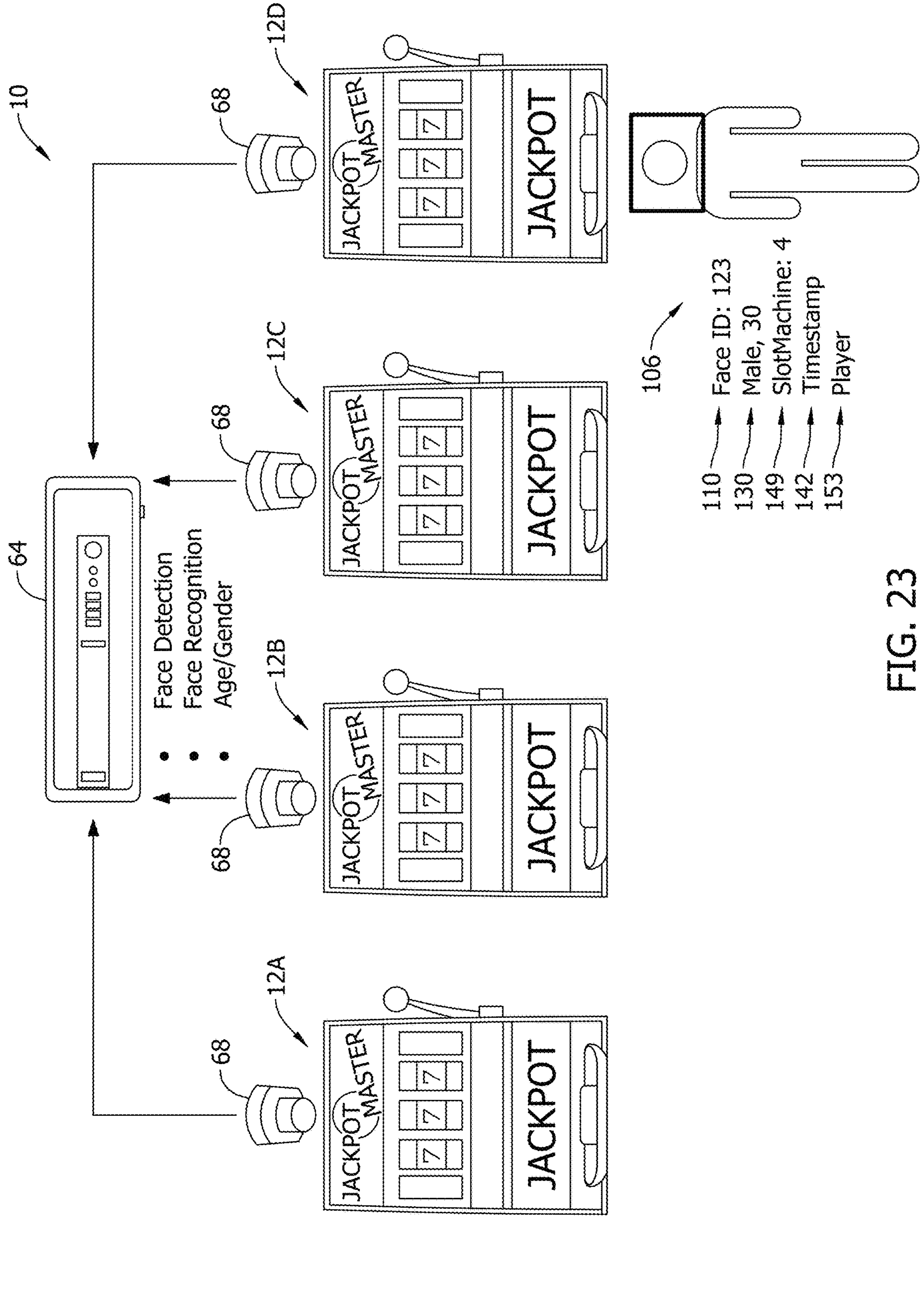

In another embodiment, as shown in FIGS. 21-24, the system 10 is configured to receive the area image including the predetermined area, for example, such as the front of the EGM 12A where a patron may stand to play on a first EGM 12A. The system 10 may detect biometric data within the predetermined area. The biometric data may be sent to the database 42 to determine whether there is a current player account 108 or an anonymous player account 126 associated with the captured biometric data. For example, the system 10 may capture a facial image, the patron's age, and/or the patron's gender. If the patron has a current player account 108/126 the system 10 may match the patron to the person ID 110/128, gender 116/130, specific EGM 12A, and timestamp when the patron is within the predetermined area, as shown in FIGS. 21 and 22. If the patron does not have a current player account the system 10 may create a new anonymous player account. In one embodiment if the patron moves into a second predetermined area, the system 10 may determine which EGM 12 the patron has moved to and timestamp when the patron is within the second EGM 12D predetermined area, as shown in FIG. 23. The system 10 may send the end time 148 of the patron's gaming activity from the first EGM 12A to the database 42 to be associated with the current player account 108/126 and the start time 144 of the patron's gaming activity from the second EGM 12D, as shown in FIG. 23.

Figure 24:
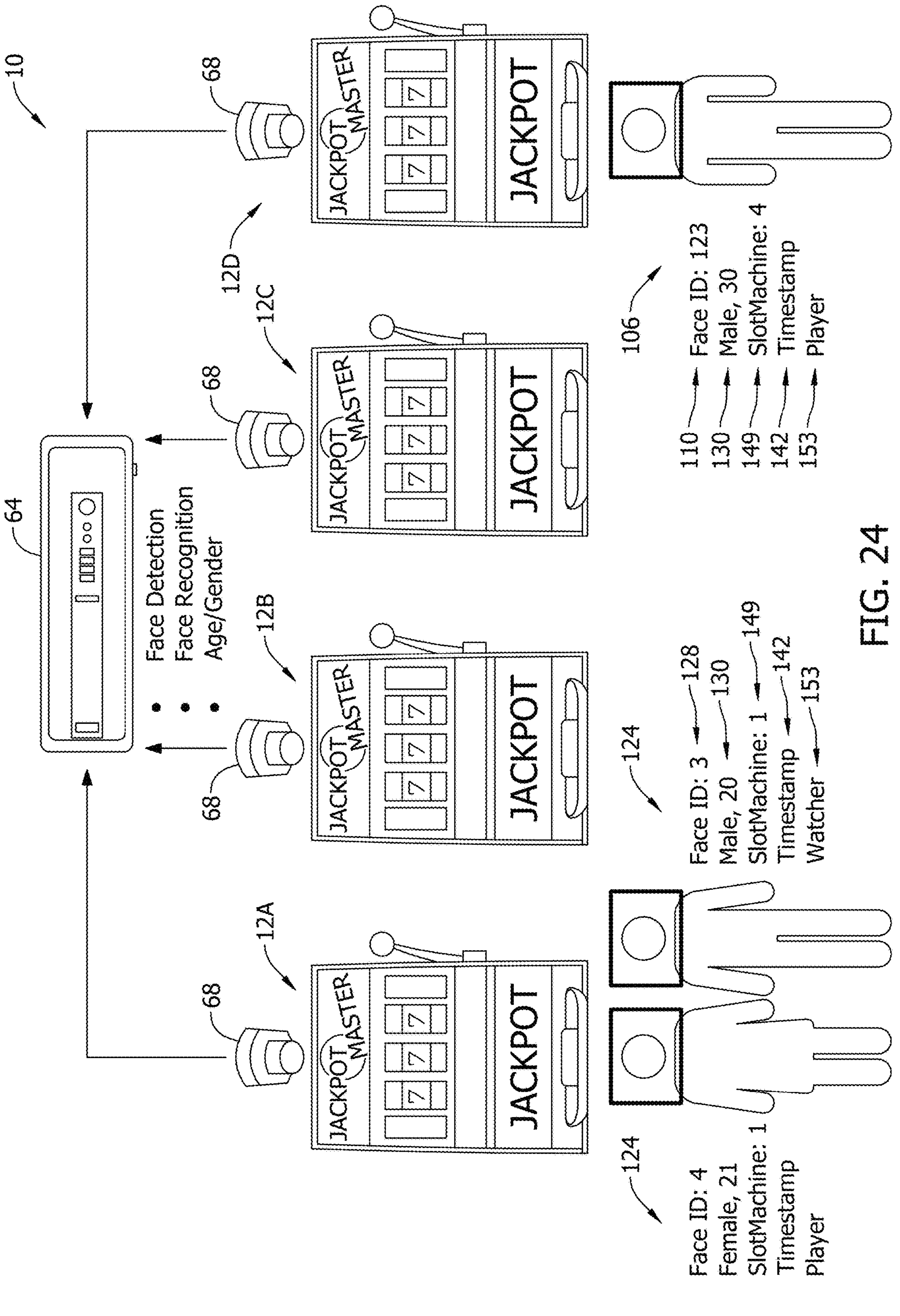
Figure 25:
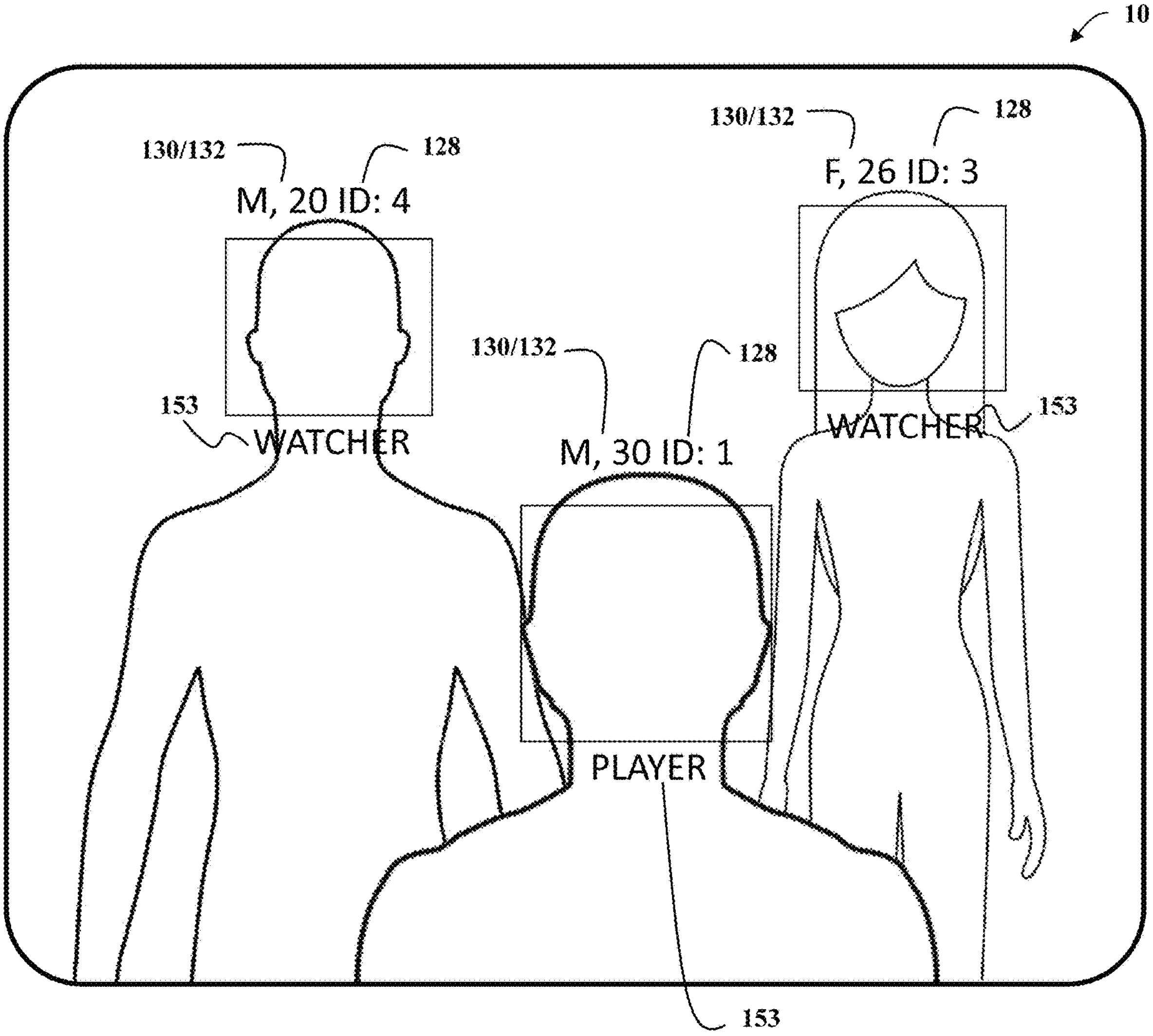
FIG. 25 illustrates an example of detecting biometric images according to an embodiment of the present invention.

In another embodiment, the system 10 may be able to determine the type of face ID within the predetermined area. For example, the system 10 may determine which face ID 114 is logging into the EGM 12A to play and which face ID 114 may be a bystander or a watcher. For example, as shown in FIG. 24, the system 10 has matched person ID 4 with a current anonymous player account 126 and determined that person ID 4 is the current player. Once player ID 4 is done playing on the first EGM 12A, the system 10 may send all of player ID 4's gaming activity to the database 42 to be associated with player ID 4's anonymous player account 126. The system 10 may not save the gaming activity to person ID 3's anonymous player account 126 because the system 10 determined that person ID 3 is a watcher and not playing the game. In another embodiment, shown in FIG. 25, the system 10 captured three separate face ID 114 and determined that the face ID 114 are paired with three separate anonymous player accounts 126. In addition, the system 10 determined that ID 3 and ID 4 are watchers of the gaming activity and ID 1 is the player on the EGM 12.

Figure 26:
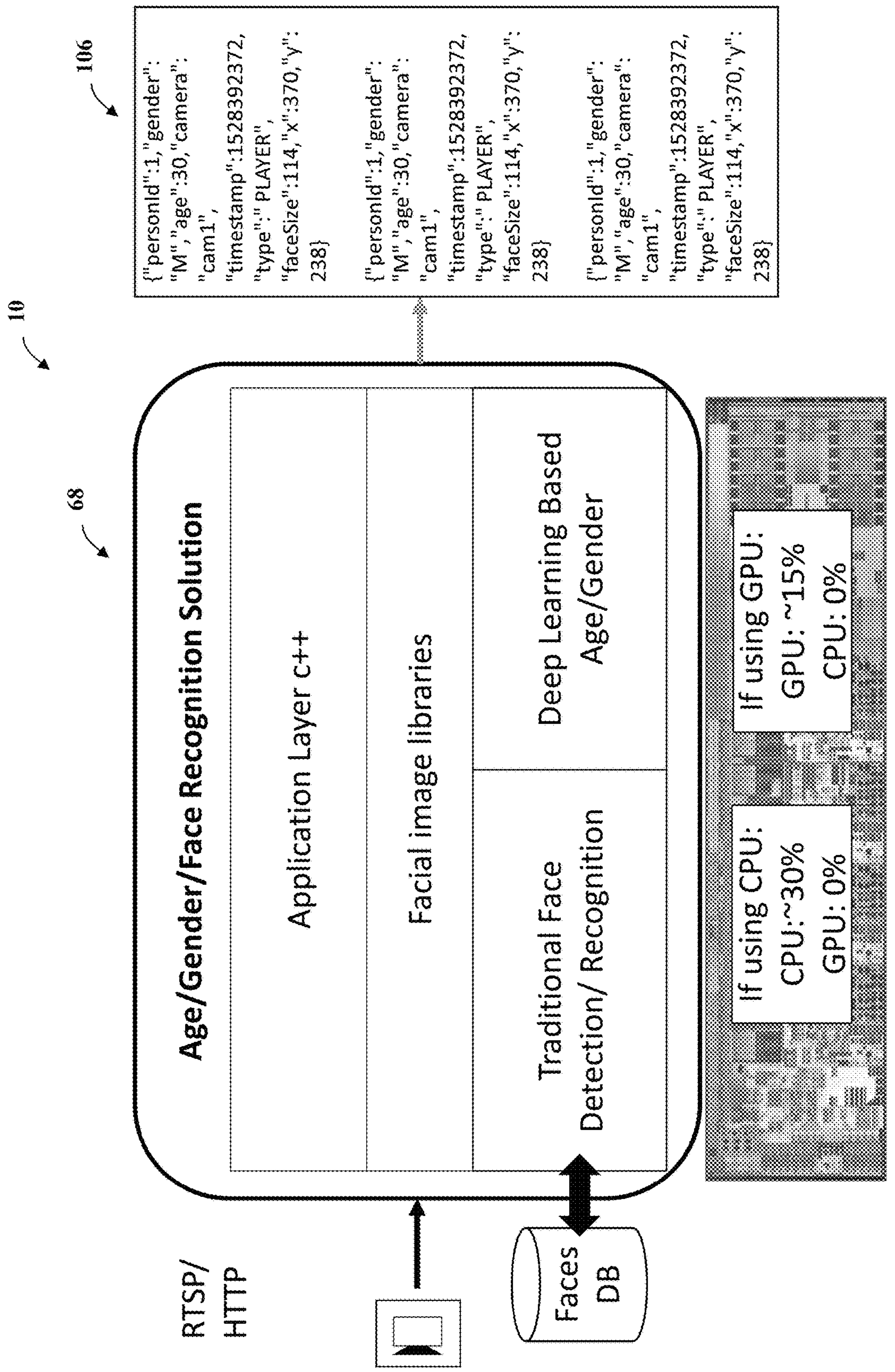
FIG. 26 is a schematic of an additional diagram of the system shown in FIGS. 1-4, according to an embodiment of the present invention.
Figure 27:
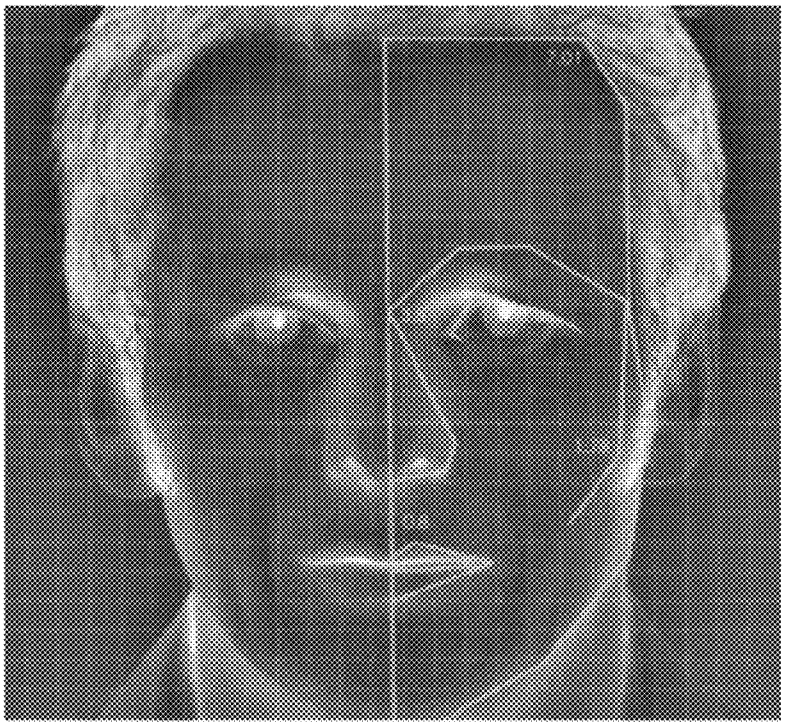
FIGS. 27 and 28 illustrate an example of the system capturing the face ID according to an embodiment of the present invention.
Figure 28:
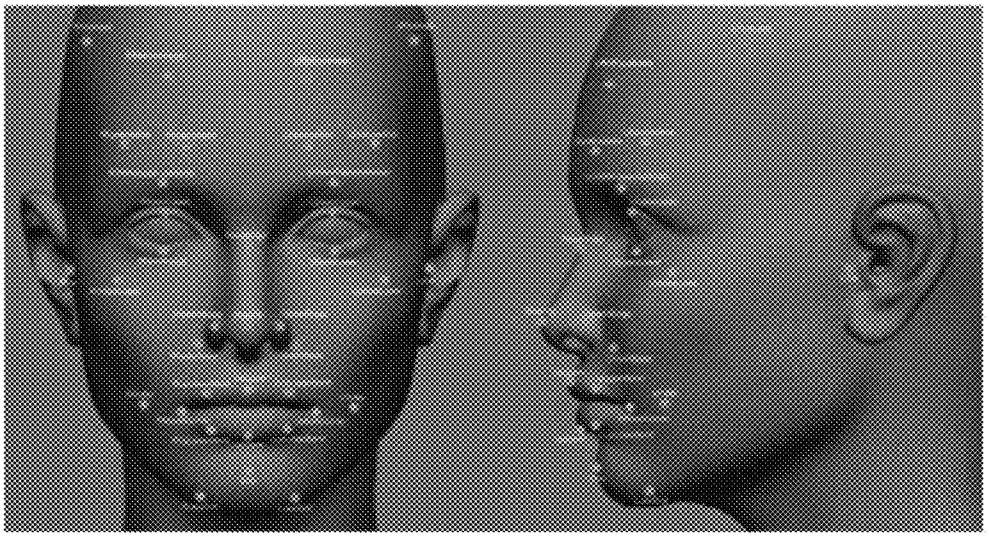

In one embodiment, as shown in FIG. 26, the system 10 may capture the biometric data, determine whether the captured biometric data matches a current player account 108 or an anonymous player account 126 and send the matched account to the EGM 12. FIGS. 27 and 28 illustrate the system 10 capturing the face size 151 of the player and the face ID 114 using the biometric data capture device 68.

Figure 29:
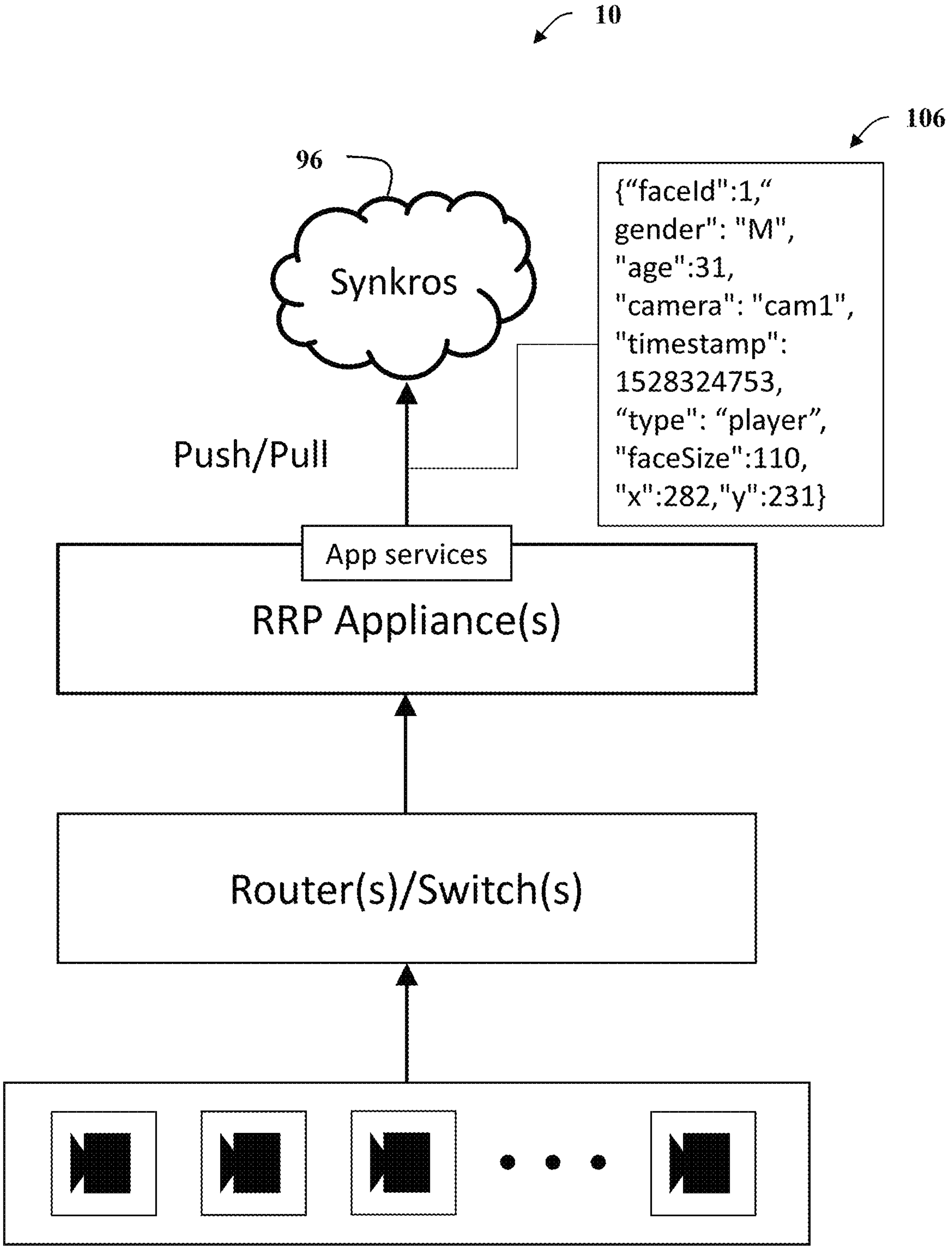
FIGS. 29 and 30 are schematics of additional diagrams of the system shown in FIGS. 1-4, according to an embodiment of the present invention.
Figure 30:
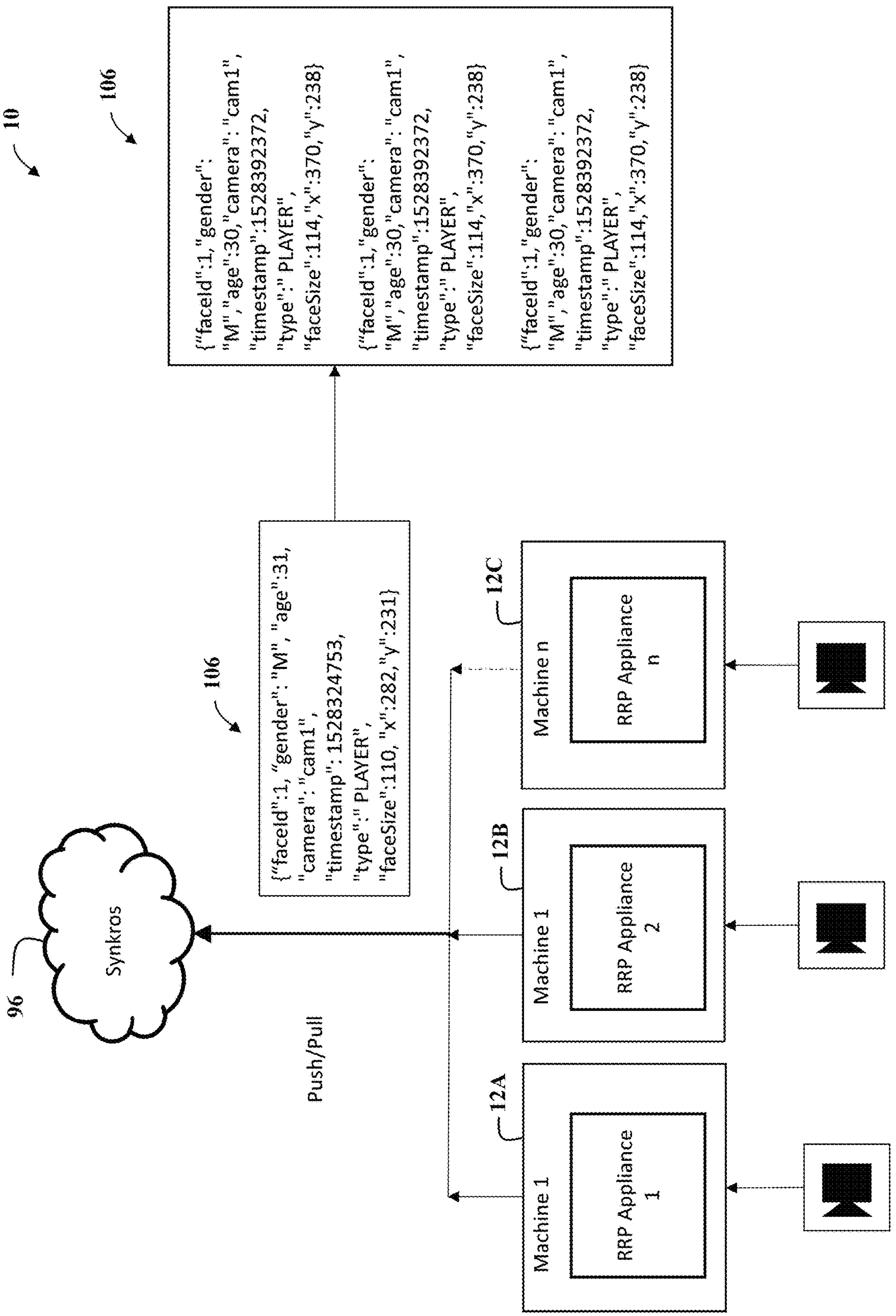

In another embodiment, shown in FIGS. 29 and 30, the system 10 may implement different applications of the gaming tracking device 96.

Figure 31:
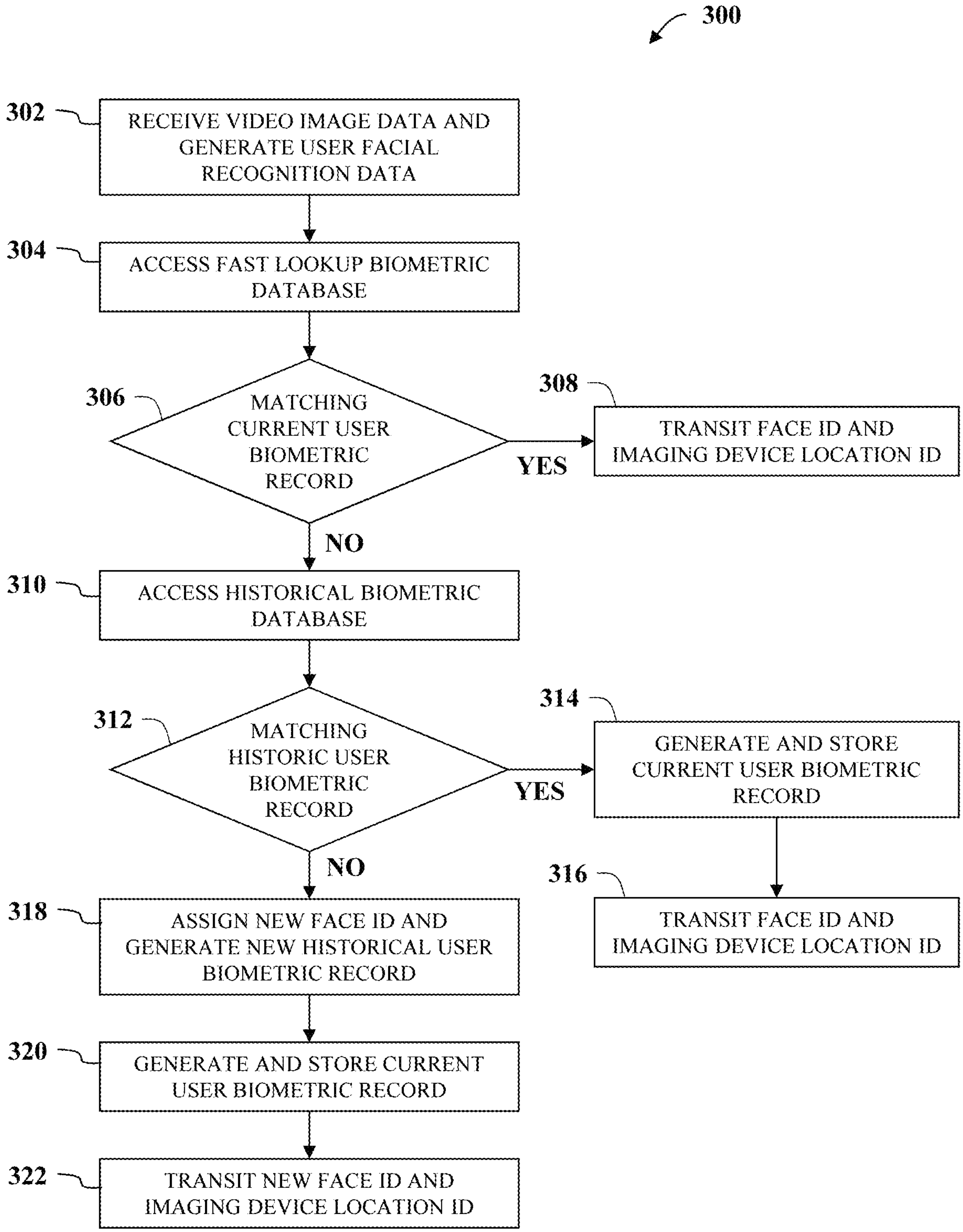
FIGS. 31 and 32 are flowchart of algorithms that may executed the system shown in FIG. 1 for providing gaming property services to a user, according to an embodiment of the present invention.
Figure 32:
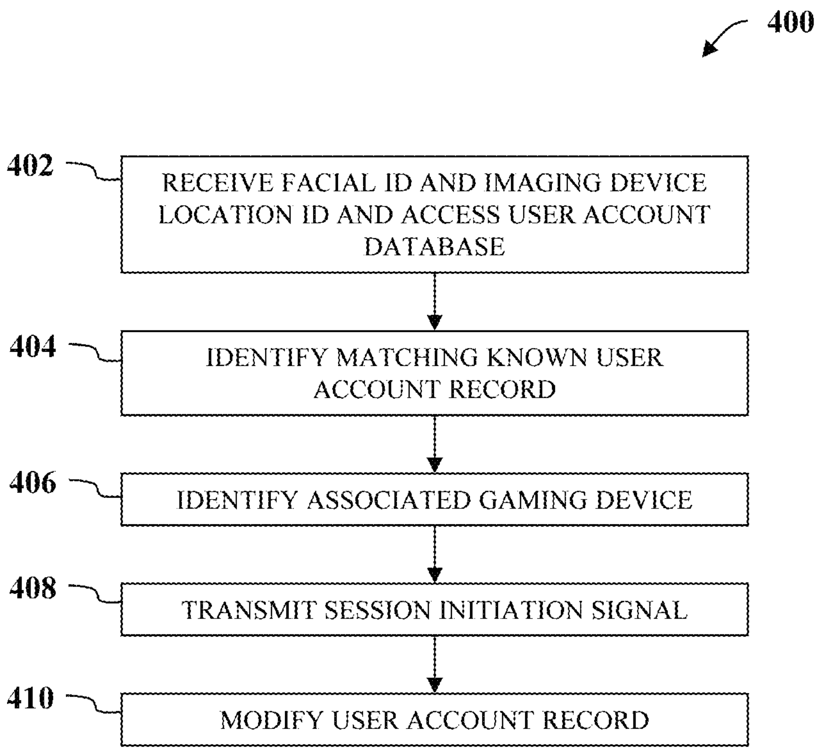

FIGS. 31 and 32 are flowcharts of methods 300 and 400 including a plurality of algorithm step that may be executed by the casino management server 18 and/or the facial recognition server system 4 generating information that may be used to provide gaming property services to a casino user. The methods 300 and 400 includes a plurality of algorithm steps. Each method step may be performed independently of, or in combination with, other method steps. Portions of the methods may be performed by any one of, or any combination of, the components of the system 10.

In method step 302, the processor of the facial recognition server system 4 receives a video image data including a user facial image from an imaging device and generate user facial recognition image data based on the received video image.

In method steps 304 and 306, the facial recognition server system 4 accesses a fast lookup biometric database and determines whether the fast lookup biometric database includes a current user biometric record having facial image data matching the generated user facial recognition image data.

Upon identifying a matching current user biometric record, the facial recognition server system 4 executes method step 308 and transmits a notification signal including the face ID included in the identified current user biometric record and the imaging device location ID to the casino management server 18 for use in identifying the known user account record.

Upon determining the fast lookup biometric database does not include a matching current user biometric record, the facial recognition server system 4 executes method step 310 and accesses the historical biometric database.

In method step 312, the facial recognition server system 4 determines whether the historical biometric database includes a historical user biometric record having facial image data matching the generated user facial recognition image data.

Upon identifying a matching historical user biometric record, the facial recognition server system 4 executes method step 314 and generates and stores a corresponding current user biometric record in the fast lookup biometric database including the face ID and facial image data included in the historical user biometric record.

In method step 316, the facial recognition server system 4 transmits the notification signal including the face ID included in the corresponding current user biometric record and the imaging device location ID to the casino management server 18 for use in identifying the known user account record.

If the facial recognition server system 4 determines that the historical biometric database does not include a historical user biometric record having facial image data matching the generated user facial recognition image data, the facial recognition server system 4 executes method step 318 and assigns a new face ID to the facial image data and generates a new historical user biometric record including the new face ID and facial image data.

In method step 320, the facial recognition server system 4 generates a new current user biometric record stored in the fast lookup biometric database including the new face ID and facial image data.

In method step 322, the facial recognition server system 4 transmits the new face ID and the imaging device location ID to the casino management server 18 for use in generating an unknown patron account record.

Referring to FIG. 32, the processor of the casino management server 18 executes algorithm 400. In method step 402, the processor of the casino management server 18 receives a notification signal from the facial recognition server system 4 including a corresponding face ID associate with a casino user and an imaging device location ID indicating an imaging device that captured video images of the casino user, and accesses a user account database including a plurality of known user account records.

In method step 404, the casino management server 18 identifies a known user account record having a user face ID matching the corresponding face ID included in the received notification signal.

In method step 406, the casino management server 18 identifies a gaming device associated with the imaging device location ID.

In method step 408, the casino management server 18 transmits a session initiation signal to the identified gaming device including instructions which cause the identified gaming device to initiate a gaming session to monitor corresponding user activity and transmit gaming session information to the casino management server.

In method step 410, the casino management server 18 modifies the known user account record to include a unique session ID and the gaming session information received from the identified gaming device.

Obviously, many modifications and variations of the present invention are possible in light of the above teachings. The invention may be practiced otherwise than as specifically described within the scope of the appended claims.

Exemplary embodiments of a system and method for providing gaming property services to a patron are described above in detail. The system and method are not limited to the specific embodiments described herein, but rather, components of the system and/or steps of the method may be utilized independently and separately from other components and/or steps described herein. For example, the system may also be used in combination with other wagering systems and methods, and is not limited to practice with only the system as described herein. Rather, an exemplary embodiment can be implemented and utilized in connection with many other monitoring applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. Processors may execute one or more program applications, such as a web browser (e.g., Microsoft Internet Explorer, Mozilla Firefox, Apple Safari, Google Chrome, and Opera, etc.), to access and view content over a computer network. In particular implementations, the program applications allow a user to enter addresses of specific network resources to be retrieved, such as resources hosted by a networking system. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page. A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBx, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

In some embodiments, a network, as describe herein, includes a network addressable system that, in various example embodiments, comprises one or more physical servers and data stores. The one or more physical servers are operably connected to a computer network via, by way of example, a set of routers and/or networking switches. In an example embodiment, the functionality hosted by the one or more physical servers may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like. Data stores may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Data stores corresponds to one or more of a variety of separate and integrated databases, such as relational databases and object-oriented databases, that maintain information as an integrated collection of logically related records or files stored on one or more physical systems.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining the patron account record indicates a barred patron.

2. The networked casino management computer system of claim 1, wherein the processor is programmed to execute the algorithm including the steps of:

transmitting the message to any device listening for a barred patron event.

3. The networked casino management computer system of claim 1, wherein the processor is programmed to execute the algorithm including the steps of:

transmitting the message to the identified gaming device to cause the identified gaming device to display a notification indicating the patron is a barred patron.

4. The networked casino management computer system of claim 1, wherein the identified gaming device includes an electric gaming machine (EGM), the processor is programmed to execute the algorithm including the steps of:

transmitting the message including lock-out instructions that cause the EGM to operate to prevent the patron from operating the EGM.

5. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining an accumulated amount of money spent during gaming sessions exceeds a predetermined amount for a predetermined period of time.

6. The networked casino management computer system of claim 5, wherein processor is programmed to execute the algorithm including the steps of:

transmitting the message including lock-out instructions that cause an EGM to operate to prevent the patron from operating the EGM.

7. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining an accumulated time spent during a gaming session exceeds a predetermined amount of time.

8. The networked casino management computer system of claim 7, wherein processor is programmed to execute the algorithm including the steps of:

transmitting the message including lock-out instructions that cause an EGM to operate to prevent the patron from operating the EGM.

9. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining a predefined period of time has elapsed over a predefined period of continuous gaming sessions.

10. The networked casino management computer system of claim 9, wherein processor is programmed to execute the algorithm including the steps of:

transmitting the message including lock-out instructions that cause an EGM to operate to prevent the patron from operating the EGM.

11. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record to cause the identified gaming device to display an anonymous player notification upon determining a matching face ID is not included in the biometric database.

12. A networked casino management computer system comprising:

a plurality of imaging devices positioned within a casino property; and a casino management server including a processor programmed to execute an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon detecting suspicious activity at the identified gaming device.

13. The networked casino management computer system of claim 12, wherein processor is programmed to execute the algorithm including the steps of:

transmitting the message including lock-out instructions that cause an EGM to operate to prevent the patron from operating the EGM.

14. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining the patron account record indicates a barred patron.

15. The method of claim 14, including the processor performing the algorithm including the steps of:

transmitting the message to any device listening for a barred patron event.

16. The method of claim 14, including the processor performing the algorithm including the steps of:

transmitting the message to the identified gaming device to cause the identified gaming device to display a notification indicating the patron is a barred patron.

17. The method of claim 14, wherein the identified gaming device includes an EGM, the method includes the processor performing the algorithm including the steps of:

transmitting the message including lock-out instructions that cause the EGM to operate to prevent the patron from operating the EGM.

18. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining an accumulated amount of money spent during gaming sessions exceeds a predetermined amount for a predetermined period of time.

19. The method of claim 18, including the processor performing the algorithm including the steps of:

transmitting the message including lock-out instructions that cause an EGM to operate to prevent the patron from operating the EGM.

20. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining an accumulated time spent during a gaming session exceeds a predetermined amount of time.

21. The method of claim 20, including the processor performing the algorithm including the steps of:

transmitting the message including lock-out instructions that cause an EGM to operate to prevent the patron from operating the EGM.

22. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining a predefined period of time has elapsed over a predefined period of continuous gaming sessions.

23. The method of claim 22, including the processor performing the algorithm including the steps of:

transmitting the message including lock-out instructions that cause an EGM to operate to prevent the patron from operating the EGM.

24. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record to cause the identified gaming device to display an anonymous player notification upon determining a matching face ID is not included in the biometric database.

25. A method of operating a networked casino management computer system including a plurality of imaging devices positioned within a casino property and a casino management server including a processor, the method including the processor performing an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon detecting suspicious activity at the identified gaming device.

26. The method of claim 25, including the processor performing the algorithm including the steps of:

transmitting the message including lock-out instructions that cause an EGM to operate to prevent the patron from operating the EGM.

27. A non-transitory computer-readable storage media having computer-executable instructions embodied thereon to operate a networked casino management computer system including a plurality of imaging devices positioned within a casino property and a casino management server including a processor, when executed by the processor the computer-executable instructions cause the processor to perform an algorithm including the steps of:

receiving a facial image of a patron from an imaging device;

identifying a gaming device associated with the imaging device;

accessing a biometric database and selecting a face ID matching the received facial image of the patron;

accessing a patron account database and identifying a patron account record associated with the selected face ID; and transmitting a message to the identified gaming device based upon data associated with the identified patron account record upon determining the patron account record indicates a barred patron.

* * * * *